(12) United States Patent
Pataer et al.

(10) Patent No.: US 12,465,610 B2
(45) Date of Patent: Nov. 11, 2025

(54) COMPOUNDS AND METHODS FOR THE TREATMENT OF PKR-ASSOCIATED DISEASES

(71) Applicant: Board of Regents, The University of Texas System, Austin, TX (US)

(72) Inventors: Apar Pataer, Houston, TX (US); Bulent Ozpolat, Houston, TX (US); Stephen G. Swisher, Houston, TX (US); Ruping Shao, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1042 days.

(21) Appl. No.: 17/429,301

(22) PCT Filed: Feb. 7, 2020

(86) PCT No.: PCT/US2020/017126
§ 371 (c)(1),
(2) Date: Aug. 6, 2021

(87) PCT Pub. No.: WO2020/163666
PCT Pub. Date: Aug. 13, 2020

(65) Prior Publication Data
US 2022/0143030 A1 May 12, 2022

Related U.S. Application Data

(60) Provisional application No. 62/802,957, filed on Feb. 8, 2019.

(51) Int. Cl.
| | | |
|---|---|---|
| *A61K 31/53* | (2006.01) | |
| *A61K 31/404* | (2006.01) | |
| *A61K 39/395* | (2006.01) | |
| *A61P 35/00* | (2006.01) | |

(52) U.S. Cl.
CPC ............ *A61K 31/53* (2013.01); *A61K 31/404* (2013.01); *A61K 39/3955* (2013.01); *A61P 35/00* (2018.01)

(58) Field of Classification Search
CPC .. A61K 31/53; A61K 31/404; A61K 39/3955; A61K 31/5377; A61K 31/4045; A61P 35/00; A61P 25/28; C07D 209/08; C07D 405/12
See application file for complete search history.

(56) References Cited

U.S. PATENT DOCUMENTS

2011/0098309 A1 4/2011 Look et al.

OTHER PUBLICATIONS

Simeone E, Grimaldi AM, Ascierto PA. Anti-PD1 and anti-PD-L1 in the treatment of metastatic melanoma. Melanoma Manag. Feb. 2015;2(1):41-50. doi: 10.2217/mmt.14.30. Epub Feb. 25, 2015. PMID: 30190830; PMCID: PMC6094609. (Year: 2015).*
Lee, H.T., Lee, J.Y., Lim, H. et al. Molecular mechanism of PD-1/PD-L1 blockade via anti-PD-L1 antibodies atezolizumab and durvalumab. Sci Rep 7, 5532 (2017). https://doi.org/10.1038/s41598-017-06002-8 (Year: 2017).*
García MA,et al;. The chemotherapeutic drug 5-fluorouracil promotes PKR-mediated apoptosis in a p53-independent manner in colon and breast cancer cells. PLoS One. 2011;6(8):e23887. doi: 10.1371/journal.pone.002 (Year: 2011).*
Gal-Ben-Ari et al; Front. Mol. Neurosci., Jan. 8, 2019 Sec. Molecular Signalling and Pathways vol. 11—2018 | https://doi.org/10.3389/fnmol.2018.00480 (Year: 2019).*
National Center for Biotechnology Information (2025). PubChem Compound Summary for CID 135504202, (Z)-N'-((2-Hydroxynaphthalen-1-yl)methylene)-1H-indole-7-carbohydrazide. Retrieved Jun. 25, 2025 from https://pubchem.ncbi.nlm.nih.gov/compound/135504202. (Year: 2025).*
Barber, G. N. "Host defense, viruses and apoptosis." *Cell Death & Differentiation* 8.2 (2001): 113-126.
Cohen, Fred E., and Jeffery W. Kelly. "Therapeutic approaches to protein-misfolding diseases." *Nature* 426.6968 (2003): 905-909.
Demirsoy, Seyma, et al. "Adapt, recycle, and move on: proteostasis and trafficking mechanisms in melanoma." *Frontiers in oncology* 6 (2016): 240.
Gal-Ben-Ari, Shunit, et al. "PKR: A kinase to remember." *Frontiers in molecular neuroscience* (2019): 480.
Hamouda, Mohamed-Amine, et al. "The small heat shock protein B8 (HSPB8) confers resistance to bortezomib by promoting autophagic removal of misfolded proteins in multiple myeloma cells." *Oncotarget* 5.15 (2014): 6252.
Hao, Chuncheng, et al. "Accumulation of RNA-dependent protein kinase (PKR) in the nuclei of lung cancer cells mediates radiation resistance." *Oncotarget* 7.25 (2016): 38235.
Hugon, Jacques, Claire Paquet, and Raymond Chuen-Chung Chang. "Could PKR inhibition modulate human neurodegeneration?." *Expert review of neurotherapeutics* 9.10 (2009): 1455-1457.
Jammi, Narasimham V., Landon R. Whitby, and Peter A. Beal. "Small molecule inhibitors of the RNA-dependent protein kinase." *Biochemical and biophysical research communications* 308.1 (2003): 50-57.
Kirkegaard, Thomas, et al. "Hsp70 stabilizes lysosomes and reverts Niemann-Pick disease-associated lysosomal pathology." *Nature* 463. 7280 (2010): 549-553.
National Center for Biotechnology Information Mcule-1607439725. PubChem entry (online). National Institute of Biotechnology Information. Dec. 2, 2013 (Retrieved on Mar. 30, 2020). Retrieved from the Internet: <URL: https://pubchem.ncbi.nlm.nih.gov/substance/169086987>; pp. 1-3.
National Center for Biotechnology Information Mcule-5997065767. PubChem entry (online). National Institute of Biotechnology Information. Dec. 2, 2013 (Retrieved on Mar. 30, 2020). Retrieved from the Internet: <URL: https://pubchem.ncbi.nlm.nih.gov/substance/169249374>; pp. 1-3.

(Continued)

*Primary Examiner* — Danah Al-Awadi
*Assistant Examiner* — Chantal Adlam
(74) *Attorney, Agent, or Firm* — pH IP Law

(57) ABSTRACT

Provided herein are RNA-dependent protein kinase (PKR)-associated compounds for the treatment of PKR-associated disorders including cancer, neurodegenerative diseases, and inflammatory conditions.

11 Claims, 24 Drawing Sheets

(56) References Cited

OTHER PUBLICATIONS

National Center for Biotechnology Information Mcule-7076282715. PubChem entry (online). National Institute of Biotechnology Information. Dec. 2, 2013 (Retrieved on Mar. 30, 2020). Retrieved from the Internet: <URL: https://pubchem.ncbi.nlm.nih.gov/substance/169154636>; pp. 1-3.

Page, G., et al. "Activated double-stranded RNA-dependent protein kinase and neuronal death in models of Alzheimer's disease." *Neuroscience* 139.4 (2006): 1343-1354.

Pataer, Abujiang, et al. "Inhibition of RNA-dependent protein kinase (PKR) leads to cancer cell death and increases chemosensitivity." *Cancer biology & therapy* 8.3 (2009): 245-252.

PCT International Search Report and Written Opinion issued in International Application No. PCT/US2020/017126, dated May 14, 2020.

Valentine, Rudy J., et al. "Imoxin attenuates LPS-induced inflammation and MuRF1 expression in mouse skeletal muscle." *Physiological Reports* 6.23 (2018): e13941.

* cited by examiner

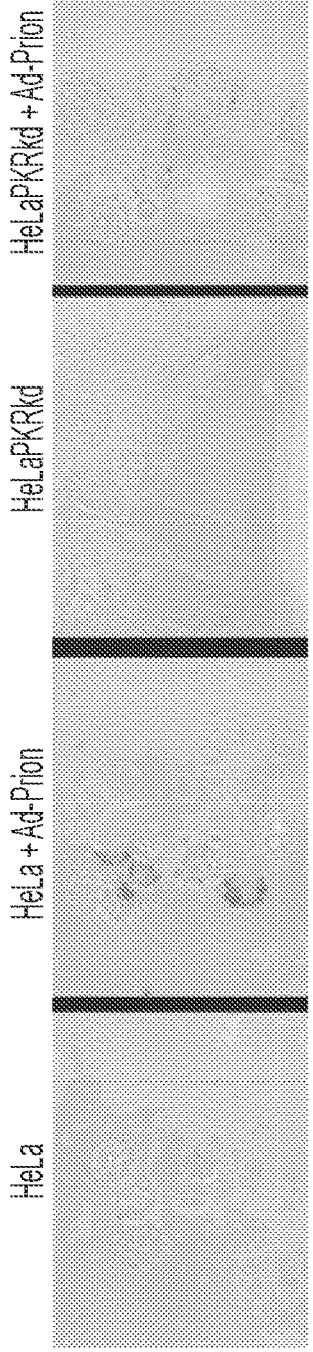
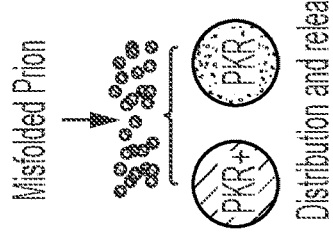
FIG. 2A
FIG. 2B
FIG. 2C
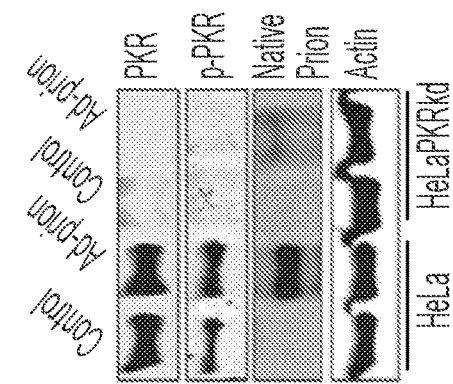
FIG. 2D

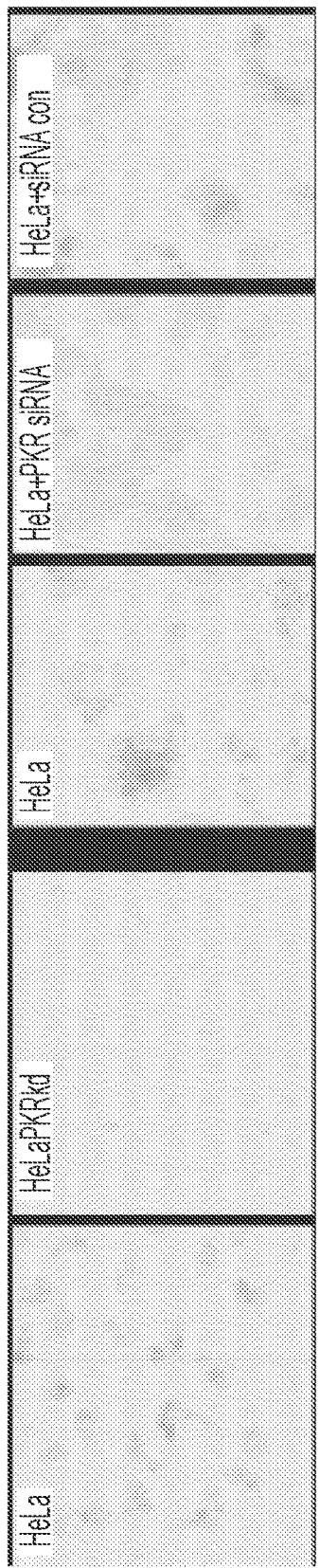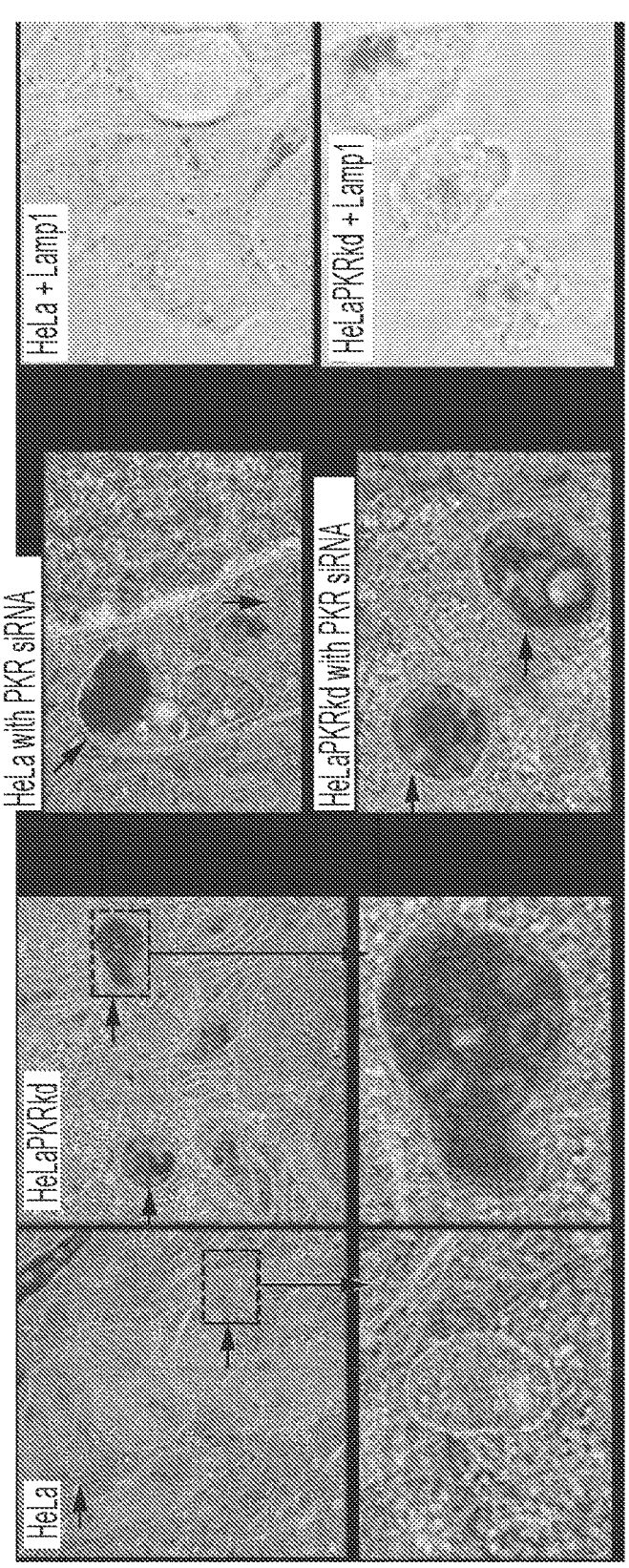

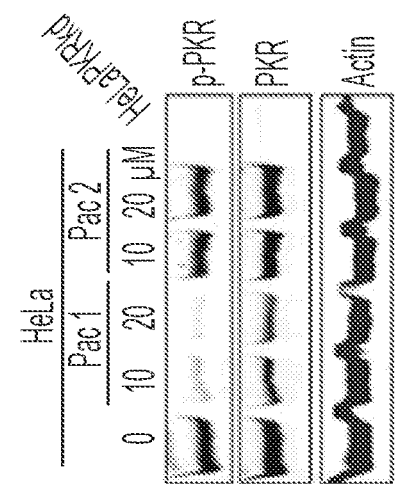
FIG. 5A
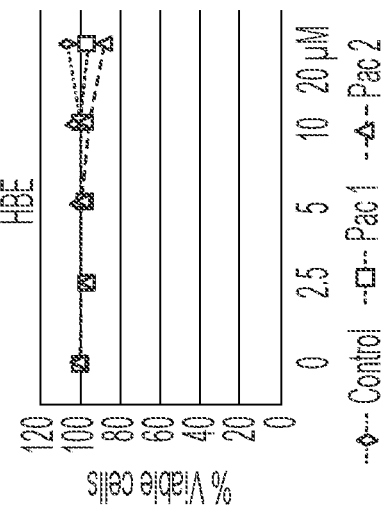
FIG. 5C
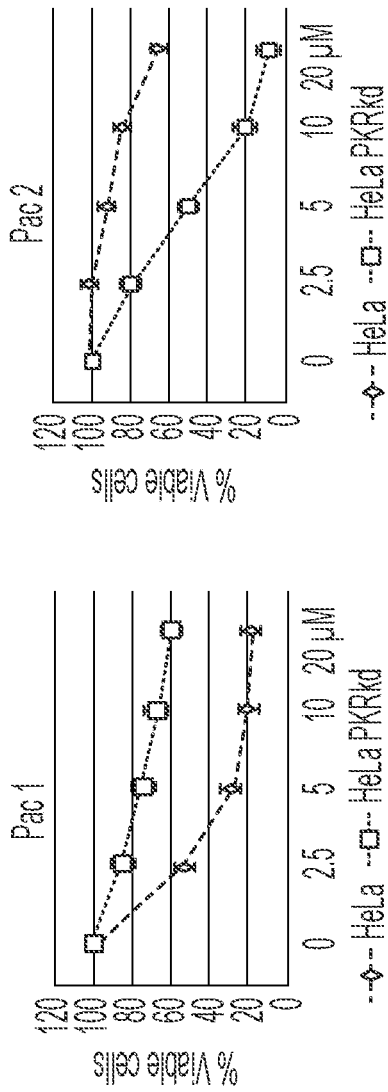
FIG. 5B
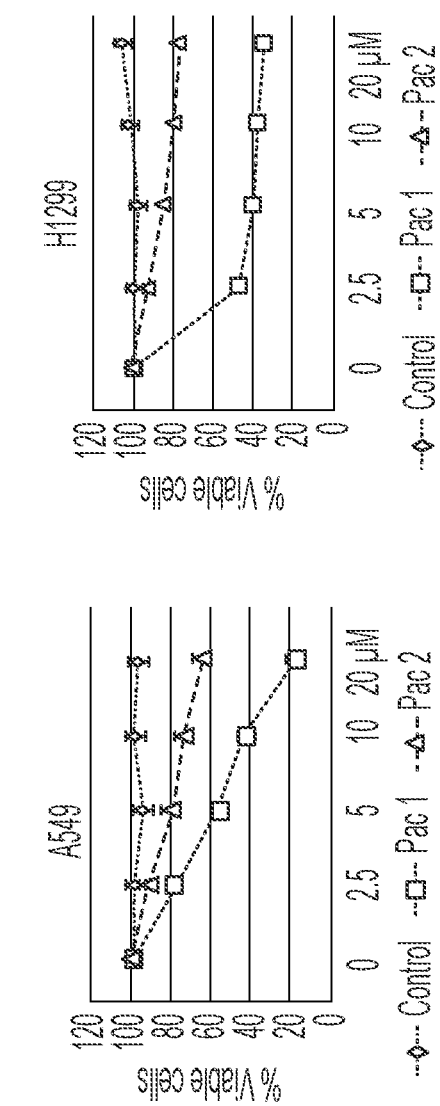
FIG. 5E
FIG. 5D
FIG. 5F

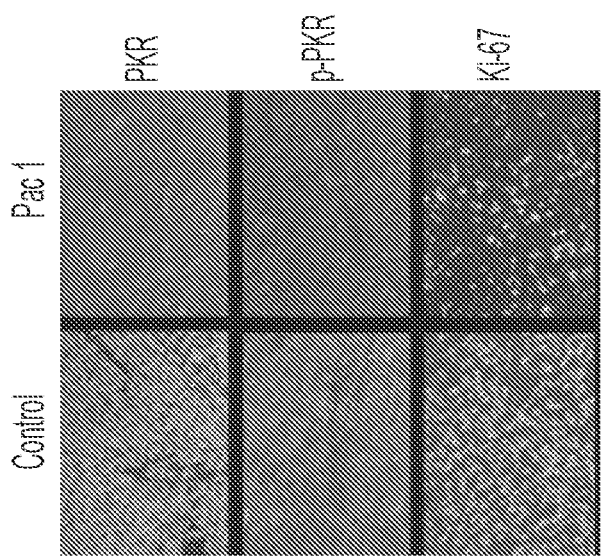
FIG. 5K
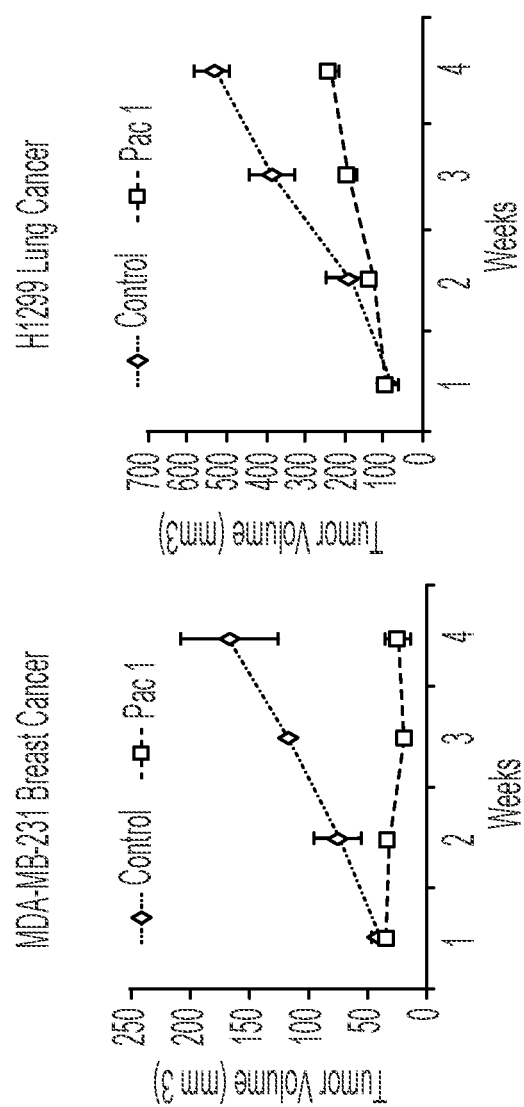
FIG. 5J
FIG. 5I

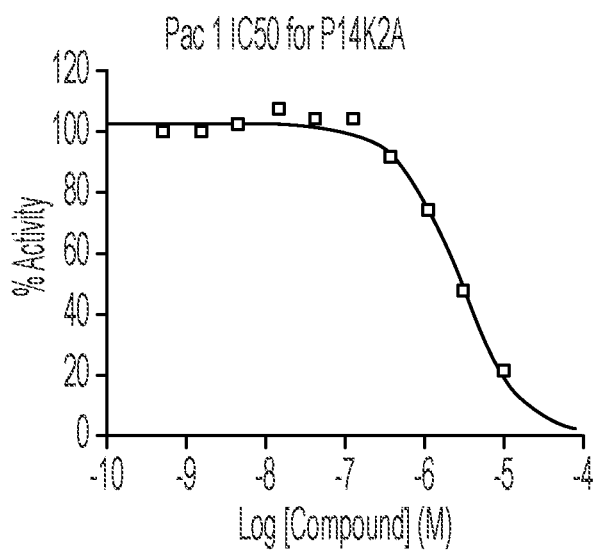
FIG. 6A
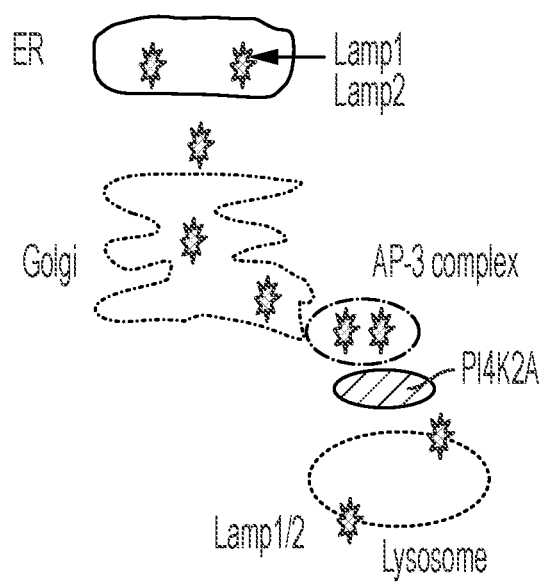
FIG. 6B
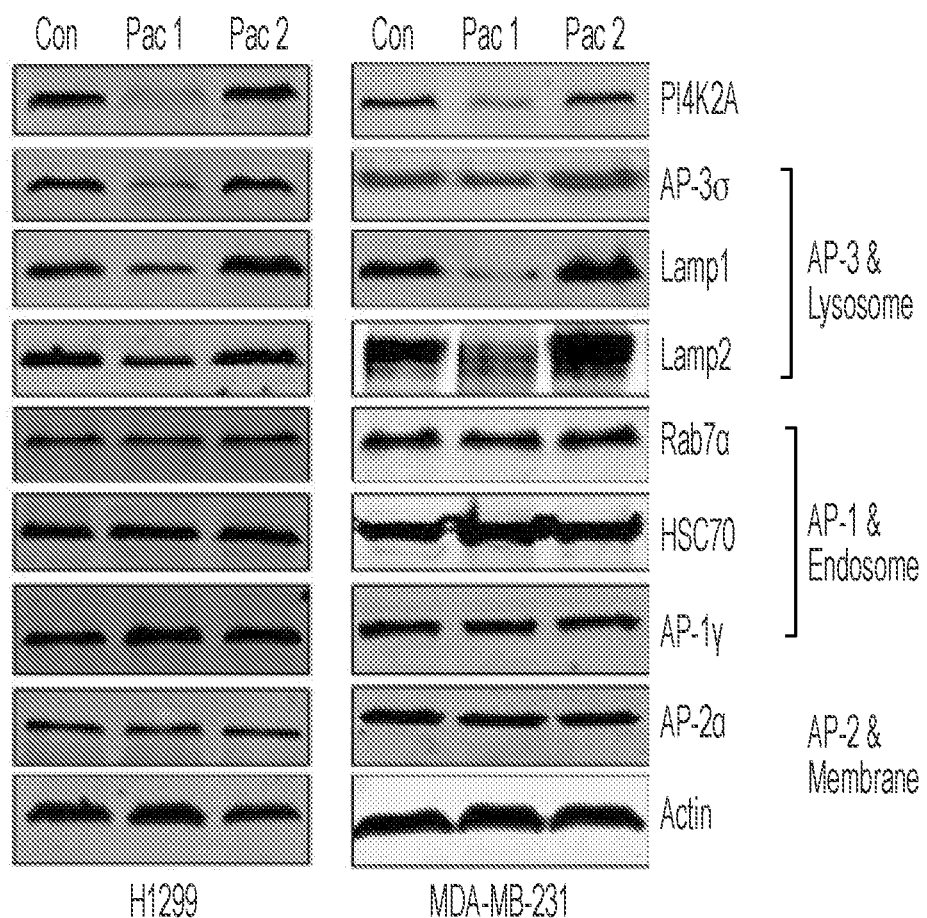

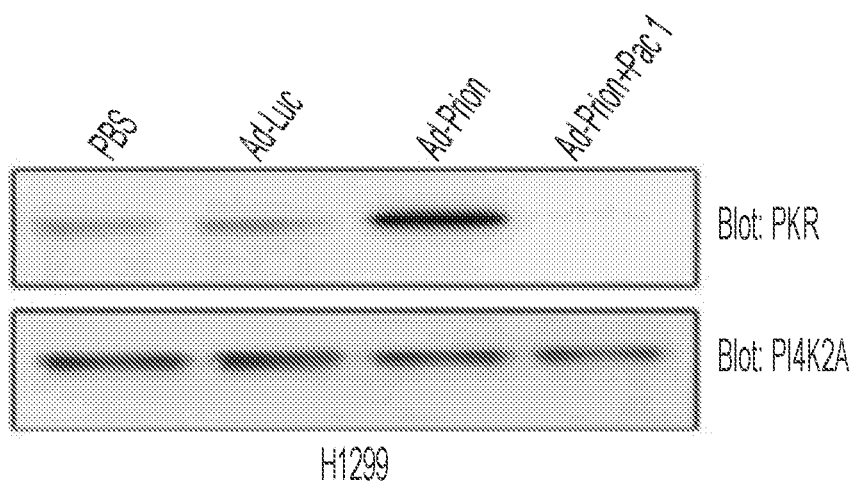
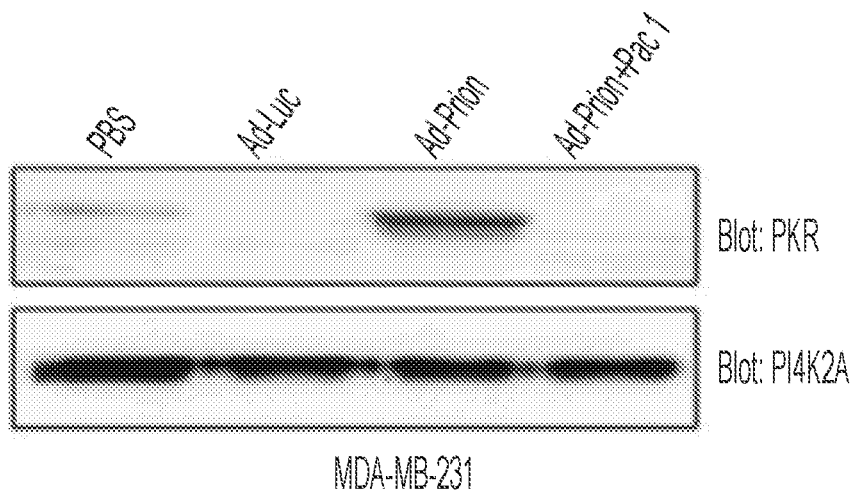
FIG. 6F

Cellular distribution of PrP after induction of PrP on PKR wild type and deficient cancer cells,

|  | HeLa + Ad-Prion | HeLaPKRkd + Ad-Prion |
| --- | --- | --- |
| Intracellular | High | Low |
| Surface PrP | Low | High |
| Extracellular PrP | Low | High |

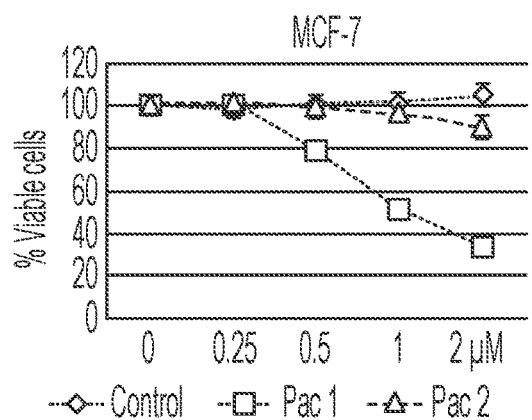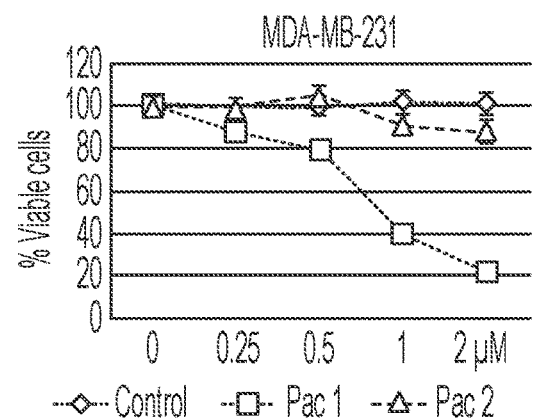
FIG. 12A  FIG. 12B
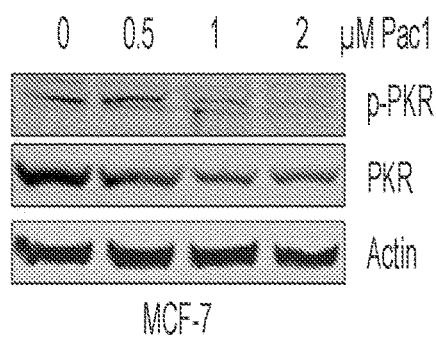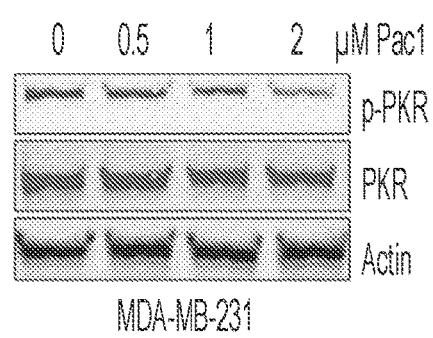
FIG. 12C  FIG. 12D

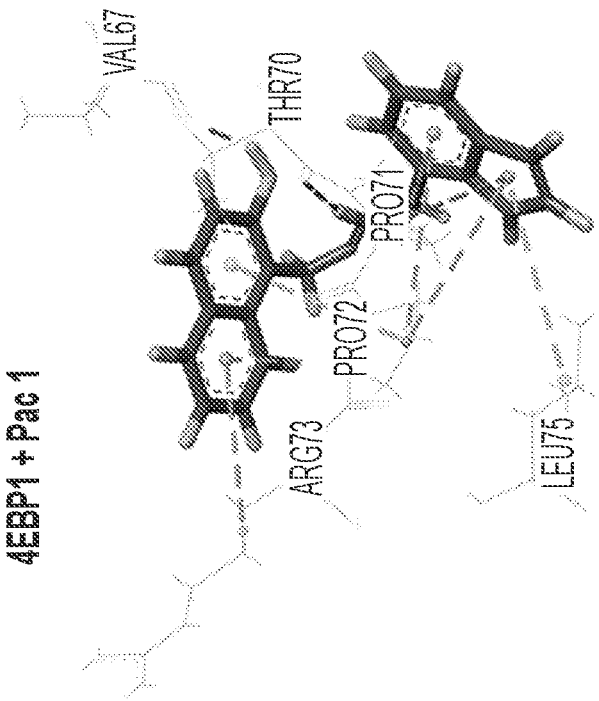
PI4K2A + Pac 1
FIG. 13A
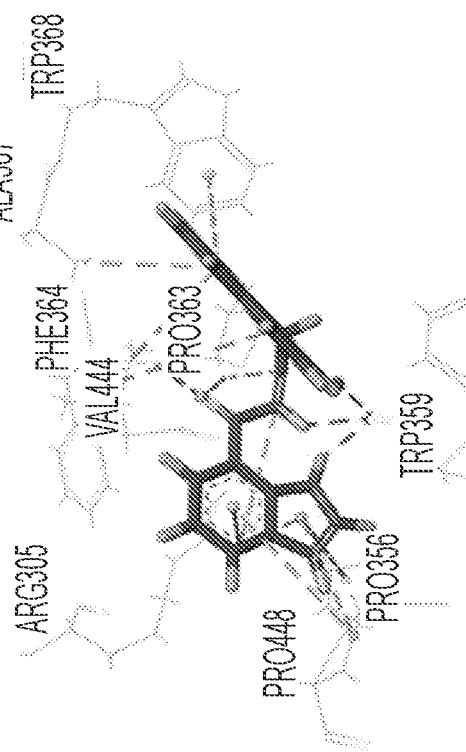
4EBP1 + Pac 1
FIG. 13B
Pac 1 possible targets
| Pac 1 | pdb_name | Free Energy of Binding (kcal/mol) | Inhibition Constant, Ki (nM) |
|---|---|---|---|
| 1 | PI4K2A | -9.27 | 160.61 |
| 2 | 4EBP1 | -6.11 | 33420 |
FIG. 13C

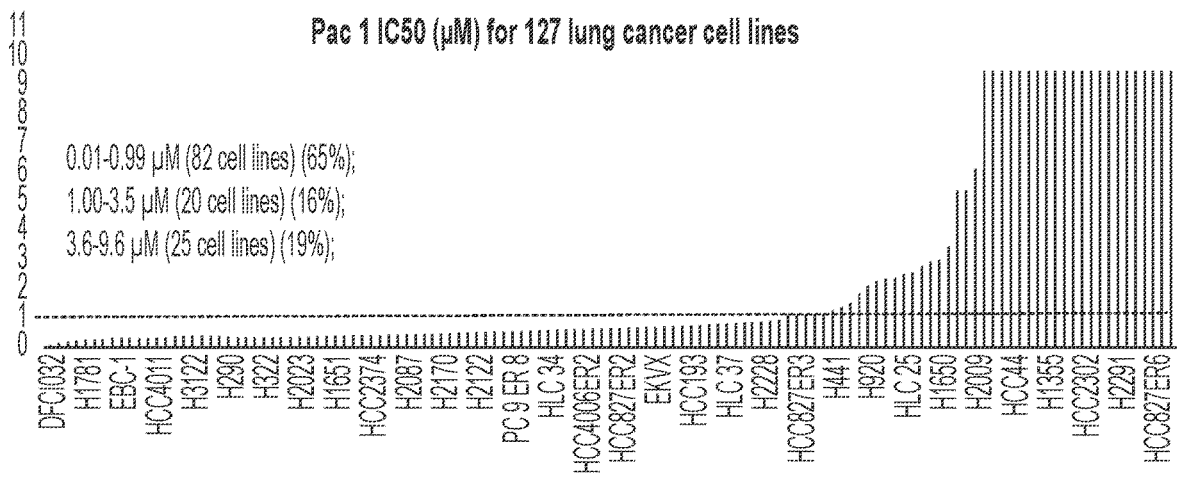
FIG. 16A
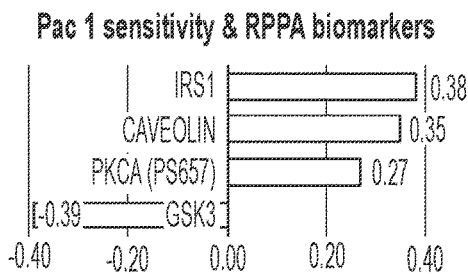
Analyzed the Pac 1 sensitivity with expression of 193 proteins.
FIG. 16B
| | Pval | Tstat |
|---|---|---|
| VCAN | 0.002 | -3.46 |
| ZNF804A | 0.01 | -2.71 |
| LOXHD1 | 0.01 | 2.61 |
| CDH12 | 0.02 | 2.46 |
FIG. 16C

COMPOUNDS AND METHODS FOR THE TREATMENT OF PKR-ASSOCIATED DISEASES

REFERENCE TO RELATED APPLICATIONS

This application is a national phase application under 35 U.S.C. § 371 of International Application No. PCT/US2020/017126, filed Feb. 7, 2020, which claims the benefit of U.S. Provisional Patent Application No. 62/802,957, filed Feb. 8, 2019, each of which is incorporated herein by reference in its entirety.

BACKGROUND

1. Field

The present invention relates generally to the field of pharmacology and medicine. More particularly, it concerns compositions and methods for the treatment of RNA-dependent protein kinase R (PKR)-associated disease.

2. Description of Related Art

It has been suggested that cancer cells depend on lysosome function for survival, as lysosomes eliminate abnormal proteins (Hamouda et al., 2014). Lysosomes break down misfolded proteins, an important defense mechanism against cell death triggered by aggregation of misfolded proteins in cells (Kirkegaard et al., 2010). Cancer cells may produce more misfolded proteins than normal cells do because of their high mutation rates, high metabolic demand, rapid growth, and aberrant glycosylation and the failure of host defense/clearance mechanisms (Cohen et al., 2003). Increasing evidence demonstrates that high levels of expression of misfolded proteins or RNA-dependent protein kinase R (PKR) are associated with the development of neurodegenerative diseases, such as Alzheimer's, Parkinson's, and Huntington's disease (Hugon et al., 2009). PKR has a well-established role in antiviral defense mechanisms and other cellular functions, such as growth control, apoptosis regulation, signal transduction, and differentiation (Barber, 2001). However, the link of PKR expression with misfolded protein expression in cancer cells is unclear. Thus, further investigation of the role of PKR and its association with misfolded protein clearance in cancer is warranted.

SUMMARY

In certain embodiments, the present disclosure provides a method for treating a disease or disorder in a subject comprising administering an effective amount of a Protein Kinase RNA-Dependent (PKR)-associated compound to the subject. In certain aspects, the PKR-associated compound is N'[(Z)-(2-Hydroxy-1-naphthyl)methylene]-1H-indole-7-carbohydrazide (Pac 1), 1,3-benzodioxole-5-carbaldehyde [4-[(4-fluorophenyl)amino]-6-(4-morpholinyl)-1,3,5-triazin-2-yl]hydrazine (Pac 2), or an analog thereof. In some aspects, the analog is N'—[(Z)-(3-Allyl-2-hydroxyphenyl)methylene]-1H-indole-7-carbohydrazide (Pac 1A1) or N'—[(Z)-(2-Hydroxyphenyl)methylene]-1H-indole-7-carbohydrazide (Pac 1A2). In particular aspects, the subject is human. In certain aspects, the subject has previously been resistant to radiation or chemotherapy.

In some aspects, the disease or disorder is cancer. In certain aspects, the cancer is lung cancer, breast cancer, colon cancer, or leukemia. In specific aspects, the cancer is PKR-positive cancer. In some aspects, the subject has been determined to have a PKR-positive cancer and the PKR-associated compound is Pac 1, Pac 1A1, or Pac 1A2. In some aspects, the PKR-associated compound inhibits PKR expression and/or PKR-mediated lysosomal function. In particular aspects, the subject has been determined to have a PKR-deficient or PKR-negative cancer and the PKR-associated compound is Pac 2. In specific aspects, the PKR-associated compound activated PKR-mediated lysosomal exocytosis function.

In additional aspects, the method further comprises administering at least a second anti-cancer therapy. In some aspects, the anti-cancer therapy is chemotherapy, radiotherapy, gene therapy, surgery, hormonal therapy, anti-angiogenic therapy or cytokine therapy. In particular aspects, the second anti-cancer therapy is administered concurrently with the PKR-associated compound. In specific aspects, the second anti-cancer agent is administering sequentially with the PKR-associated compound. For example, the anti-cancer therapy is an immune checkpoint inhibitor. In particular aspects, the immune checkpoint inhibitor is an anti-PD1 antibody, such as nivolumab, pembrolizumab (KEYTRUDA®), pidillizumab, AMP-514, REGN2810, CT-011, BMS 936559, MPDL3280A or AMP-224. In some aspects, the at least one immune checkpoint inhibitor is an anti-CTLA-4 antibody, such as tremelimumab, or ipilimumab (YERVOY®). In certain aspects, the immune checkpoint inhibitor is an anti-PD-L1 antibody. In particular aspects, the anti-PD-L1 antibody is atezolizumab, avelumab, or durvalumab.

In certain aspects, the disease or disorder is a neurodegenerative disease. In specific aspects, the Alzheimer's disease, Parkinson's disease, or Huntington's disease. In some aspects, the PKR-associated compound increases the excitability of brain cells and/or enhances memory.

In some aspects, the disease or disorder is an inflammatory disease. In certain aspects, the PKR-associated compound decreases inflammation. For example, the inflammatory disease is rheumatoid arthritis.

In some aspects, the compound is administered orally, intraadiposally, intraarterially, intraarticularly, intracranially, intradermally, intralesionally, intramuscularly, intranasally, intraocularly, intrapericardially, intraperitoneally, intrapleurally, intraprostatically, intrarectally, intrathecally, intratracheally, intratumorally, intraumbilically, intravaginally, intravenously, intravesicularlly, intravitreally, liposomally, locally, mucosally, parenterally, rectally, subconjunctival, subcutaneously, sublingually, topically, transbuccally, transdermally, vaginally, in crèmes, in lipid compositions, via a catheter, via a lavage, via continuous infusion, via infusion, via inhalation, via injection, via local delivery, or via localized perfusion. In some aspects, the compound is administered once to the subject. In particular aspects, the compound is administered two or more times to the subject.

Further provided herein is a composition comprising an effective amount of a PKR-associated compound for use in the treatment of a disease or disorder in a subject. In particular aspects, the PKR-associated compound is Pac 1, Pac 2, or an analog thereof. In some aspects, the subject is human. In some aspects, the subject has previously been resistant to radiation or chemotherapy.

In certain aspects, the disease or disorder is cancer. In some aspects, the cancer is lung cancer, breast cancer, colon cancer, or leukemia. In particular aspects, the cancer is PKR-positive cancer. In some aspects, the subject has been determined to have a PKR-positive cancer and the PKR-associated compound is Pac 1, Pac 1A1, or Pac 1A2. In certain aspects, the PKR-associated compound inhibits PKR expression and/or PKR-mediated lysosomal function. In some aspects, the subject has been determined to have a PKR-deficient or PKR-negative cancer and the PKR-associated compound is Pac 2. In certain aspects, the PKR-associated compound activated PKR-mediated lysosomal exocytosis function.

In additional aspects, the composition further comprises at least a second anti-cancer therapy. In some aspects, the anti-cancer therapy is chemotherapy, radiotherapy, gene therapy, surgery, hormonal therapy, anti-angiogenic therapy or cytokine therapy.

In particular aspects, the second anti-cancer therapy is administered concurrently with the PKR-associated compound. In specific aspects, the second anti-cancer agent is administering sequentially with the PKR-associated compound. For example, the anti-cancer therapy is an immune checkpoint inhibitor. In particular aspects, the immune checkpoint inhibitor is an anti-PD1 antibody, such as nivolumab, pembrolizumab (KEYTRUDA®), pidillizumab, AMP-514, REGN2810, CT-011, BMS 936559, MPDL3280A or AMP-224. In some aspects, the at least one immune checkpoint inhibitor is an anti-CTLA-4 antibody, such as tremelimumab, or ipilimumab (YERVOY®). In certain aspects, the immune checkpoint inhibitor is an anti-PD-L1 antibody. In particular aspects, the anti-PD-L1 antibody is atezolizumab, avelumab, or durvalumab.

In some aspects, the disease or disorder is a neurodegenerative disease. In certain aspects, the Alzheimer's disease, Parkinson's disease, or Huntington's disease. In some aspects, the PKR-associated compound increases the excitability of brain cells and/or enhances memory.

In other aspects, the disease or disorder is an inflammatory disease. In some aspects, in the PKR-associated compound decreases inflammation. In particular aspects, the inflammatory disease is rheumatoid arthritis.

Another embodiment provides a method of inhibiting PKR expression and/or lysosomal function in a subject comprising administering an effective amount of Pac 1 or an analog thereof to the subject. In some aspects, the analog is Pac 1A1 or Pac 1A2.

A further embodiment provides a method to enhance learning and/or memory comprising administering an effective amount of a PKR-associated compound to the subject, wherein the PKR-associated compound is Pac 1, Pac 2, Pac 1A1, or Pac 1A2. In some aspects, the method increases excitability of brain cells. In certain aspects, the subject has age-associated memory loss.

Also provided herein is pharmaceutical composition comprising Pac 1, Pac 2, Pac 1A1, or Pac 1A2 and a pharmaceutically acceptable excipient.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

The term "about" means in general, the stated value plus or minus 5%.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 2A-2F: PKR affects the distribution and release of misfolded PrPs. A, The experimental model. B, Immunofluorescent confocal microscopic analysis of native PrP expression in HeLa and HeLaPKRkd cells 48 hours after transfection with Ad-Prion (2500 viral particles/cell) or without transfection. HeLaPKRkd cells exhibited excess surface PrPs (mostly in misfolded form) after Ad-Prion transfection. C, Average levels of native and misfolded PrP expression in HeLa and HeLaPKRkd cells 48 hours after transfection with Ad-Prion. Native and misfolded PrP values were normalized according to isotype control values. Experiments were performed in triplicate; data are presented as means. D, Western blot of HeLa and HeLaPKRkd cells for expression of PKR, p-PKR, and PrPs 48 hours after transfection with Ad-Prion (2500 viral particles/cell) or without transfection. Actin was used as a loading control. E, Immunofluorescent confocal microscopic images of native PrP expression in HeLaPKRkd cells and HeLaPKRkd cells with re-expression of PKR (or Luc) 48 hours after transfection with Ad-Prion (2500 viral particles/cell) or without transfection. F, Western blot analysis of native PrPs in HeLaPKRkd cells with re-expression of PKR (or Luc) 48 h after transfection with Ad-Prion (2500 viral particles/cell) or without transfection.

FIGS. 4A-4E: PKR-knockdown cells have impaired lysosome function. A, Microscopic images of HeLa and HeLaPKRkd cells subjected to LysoTracker Red staining. B, Microscopic images of HeLa cells subjected to LysoTracker Red staining 48 hours after treatment with PKR siRNA or control siRNA. C, TEM images of HeLa and HeLaPKRkd cells. The arrows indicate lysosomes in the HeLa cell and MVBs/exosomes in the HeLaPKRkd cell. D, TEM images of HeLa and HeLaPKRkd cells treated with PKR siRNA. The arrows indicate damaged lysosomes in the PKR siRNA-treated HeLa cell and intact MVBs/exosomes in the PKR siRNA-treated HeLaPKRkd cell. E, Confocal microscopic analysis of the expression of Lamp1 protein in HeLa and HeLaPKRkd cells 48 hours after transfection with Ad-Lamp1-GFP (2500 viral particles/cell).

FIGS. 5A-5L: Treatment with PKR-modulating compounds inhibits cancer cell growth in vivo. A and B, Viability of HeLa and HeLaPKRkd cells as determined using an SRB assay 72 hours after treatment with Pac 1 (A) or Pac 2 (B). Experiments were performed in triplicate, and the data are presented as means. C, Representative Western blot of expression of PKR and p-PKR protein in HeLa cells 72 hours after treatment with Pac 1 or Pac 2. HeLaPKRkd cells were used as controls. D-G, Viability of lung cancer cells (D and E) and normal cells (F and G) 72 hours after treatment with Pac 1 or Pac 2 as determined using an SRB assay. HMEC, human mammary epithelial cells. H, Western blot for expression of PKR and p-PKR protein in lung cancer and normal cells 72 hours after treatment with 5 µM Pac 1 or Pac 2. I and J, Growth of MDA-MB-231 breast (I) and H1299 lung (J) tumor xenografts in an orthotopic mouse model. Tumor growth in both models was markedly lower in tumors intravenously injected with Pac 1 than in untreated control tumors. Tumor volumes (y-axes) were measured in five to six mice per group over 28 days. The data are presented as means (error bars, standard deviation). K, Immunohistochemical analysis of H1299 lung tumors showing that the growth inhibition observed in Pac 1-treated mice was caused by reductions in PKR, p-PKR, and Ki-67 protein expression. L, The chemical structures of Pac 1 and Pac 2.

FIGS. 6A-6G: Treatment with Pac 1 inhibits PI4K2A expression and impairs lysosome function in cancer cells. A, The half-maximal inhibitory concentration (IC50) of Pac 1 for PI4K2A kinase as determined by Reaction Biology Corp. using a high-throughput enzymatic assay. B, Mechanism of action of PI4K2A on the AP-3 complex in cancer cells. ER, endoplasmic reticulum. C, Western blot of expression of AP-1, AP-2, and AP-3 complex-associated proteins in lung and breast cancer cells 72 hours after treatment with 5 µM Pac 1 or Pac 2. Actin expression was used as a loading control (Con). D, Microscopic images of HeLa, H1299, and MDA-MB-231 cells stained with LysoTracker Red 72 hours after treatment with 5 µM Pac 1. E, TEM images of HeLa and HeLaPKRkd cells treated with 5 µM Pac 1. The arrows indicate damaged lysosomes in the Pac 1-treated HeLa cell and intact MVBs/exosomes in the Pac 1-treated HeLaPKRkd cell. F, Protein fractions obtained from H1299 and MDA-MB-231 cells treated with PBS, Ad-Luc, Ad-Prion (2500 viral particles/cell), or Ad-Prion plus Pac 1 (5 µM) for 48 hours were immunoprecipitated with anti-human PI4K2A and assayed for PKR or PI4K2A protein. G, Differential scanning fluorimetry curve showing that Pac 1 bound to PI4K2A and caused a decrease in the melting temperature of PI4K2A protein.

FIGS. 12A-12D: Effects of treatment with PKR-modulating compounds on breast cancer cell lines. A and B, Viability of two breast cancer cell lines as determined using an SRB assay 72 hours after treatment with Pac 1 or Pac 2. C and D, Western blot of the expression of PKR and p-PKR protein in the two breast cancer cell lines 72 hours after treatment with Pac 1 at various doses.

FIGS. 13A-13C: Use of molecular docking to predict the binding conformation of Pac 1 to the appropriate targets. Pac 1 could bind to PI4K2A (A), but not 4EBP1 (B). (C). Pac 1 modulated PI4K2A activity at low concentrations.

FIGS. 16A-16C: Treatment with PKR-modulating compounds inhibits lung cancer cell growth in vitro. (A) the $IC_{50}$ of Pac 1 in 127 human lung cancer cell lines as determined using an SRB assay. (B) RPPA analysis of Pac 1-sensitive cancer cells showing correlation of Pac 1 sensitivity with higher expression of GSK3 and lower expression of IRS1, Caveolin and PKCA. (C) Analysis of Pac 1-sensitive cancer cells showing correlation of Pac 1 sensitivity with several gene mutation.

DESCRIPTION OF ILLUSTRATIVE EMBODIMENTS

Figure 1A:
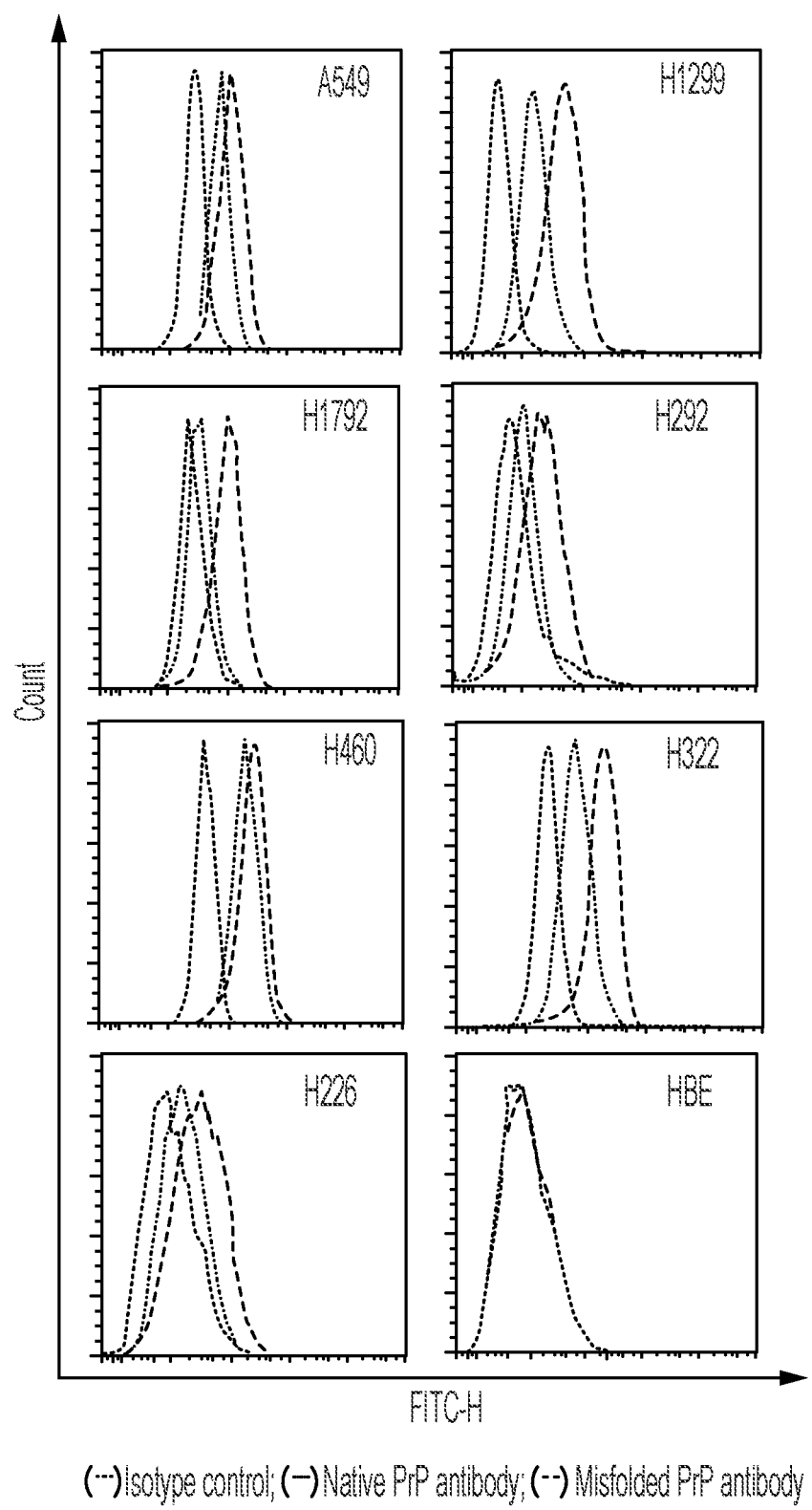
FIGS. 1A-1E: Correlation of PKR expression with misfolded PrP levels in lung cancer cells. A, FACS analysis of native and misfolded PrPs in human lung cancer cell lines and normal HBE cells. B, Average numbers of native and misfolded PrPs in human lung cancer cell lines and HBE cells as determined using FACS. Native and misfolded PrP values were normalized according to isotype control values. Experiments were performed in triplicate; data are presented as means. C, Western blot of seven human lung cancer cell lines and one normal cell line (HBE) for expression of PKR and p-PKR protein. Actin was used as a loading control. D, FACS analysis of native and misfolded PrPs in A549 cells 48 hours after transfection with Ad-Luc or Ad-PKR (2500 viral particles/cell). E, Western blot analysis of native PrPs in A549 cells 48h after transfection with Ad-Luc or Ad-PKR (2500 viral particles/cell).

RNA-dependent protein kinase (PKR) has a well-established role in antiviral defense mechanisms. High levels of PKR or misfolded proteins are associated with several degenerative diseases. However, little is known about the role of PKR and misfolded protein release in cancer. The present studies showed that PKR directly contributes to lysosome function for protein degradation and that loss of PKR in cancer cells destabilizes lysosome function. Primary lung cancer cells, but not normal cells, expressed misfolded PrPs, and induction of PKR reduced misfolded PrPs in lung cancer cells. It was demonstrated that PKR prevents misfolded PrP release in cancer cells.

In the present studies, a new role of PKR was demonstrated on misfolded protein clearance in cancer cells. It was found that PKR regulates misfolded protein clearance in cancer cells and contributes directly to lysosome function and that reduction of PKR expression in cancer cells impairs lysosome function. On the basis of these findings, the inventors hypothesized that destabilizing PKR-associated lysosome function is an effective approach to cancer therapy. To test this hypothesis, a 10,000-compound library was screened, and PKR-associated compound 1 (Pac 1) was identified that selectively induced cell death in cancer cells and inhibited the growth of human tumor xenografts in mice without toxicity. The present findings demonstrated that treatment with Pac 1 binds to PI4K2A and disrupts PKR/PI4K2A network, contributing directly to destabilization of cancer cell lysosomes and triggering cell death. These results improved the understanding of PKR/PI4K2A lysosome networks which can lead to the development of unique and highly specific targeted therapies for cancer.

Accordingly, in certain embodiments, the present disclosure provides compositions and methods for destabilizing lysosome function by targeting PKR, such as for cancer therapy. Embodiments also provide compounds (PKR associated compound 1 and 2; N'[(Z)-(2-Hydroxy-1-naphthyl)methylene]-1H-indole-7-carbohydrazide and 1,3-benzodioxole-5-carbaldehyde [4-[(4-fluorophenyl)amino]-6-(4-morpholinyl)-1,3,5-triazin-2-yl]hydrazine) for the treatment of PKR positive/or negative cancer as well as various PKR associated diseases by modulating the PKR's function. The present disclosure also provides Pac 1 analog compounds; Pac 1A1: N'—[(Z)-(3-Allyl-2-hydroxyphenyl)methylene]-1H-indole-7-carbohydrazide and Pac 1A2: N'—[(Z)-(2-Hydroxyphenyl)methylene]-1H-indole-7-carbohydrazide for the treatment of PKR associated diseases. PKR-associated compounds may be used for the selective killing of cancer cells depending on their PKR status. Additional methods may comprise the use of an antibody against misfolded PrP, such as to specifically deliver drugs to tumor cells but not normal cells.

Pac 1 is a PKR inhibitor which inhibits the PKR expression, and therefore inhibits PKR-mediated function including lysosomal function. Pac 2 activates PKR mediated lysosomal exocytosis function. Pac 1 treatment resulted in reduction of PKR expression and growth inhibition in lung, breast, and colon cancer and leukemia cell lines. In addition, Pac 1 inhibited the growth of human lung and breast tumor xenografts in mice. Pac 1's mechanism of action comprised inhibition of phosphatidylinositol 4-kinase IIa. (PI4K2A), reducing PKR expression; inducing lysosome dysfunction; and inactivating the catalytic subunit of protein phosphatase 2A (PP2Ac) complex. The present study also demonstrated that Pac 2 induced lysosomal exocytosis in PKR wild-type cells but destroyed multivesicular bodies/exosomes in PKR-deficient cells.

Thus, the present compounds may be used for the treatment of different PKR-associated disease conditions by modulating PKR's function. Pac 1 and Pac 2 compounds have potent in vitro cytotoxic activity against numerous human tumors, both of solid and hematological origin. Thus, Pac 1 and/or Pac 2 may be used for the treatment of cancer. Pac 1 may be used to trigger lysosomal cell death in PKR positive cancer, and Pac 2 may be used to trigger cell death in PKR deficient/or negative cancer. Pac 1 can inhibit PD-L1 in cancer cells and may enhance cancer immunotherapy by PD-L1 Blockade. Pac 1 also inhibits cytoprotective autophagy, and therefore may overcome drug and radiation resistance in cancer.

The present compounds may be used for the treatment of neurodegenerative diseases. Evidence indicated that high levels of PKR or misfolded proteins was associated with neurodegenerative diseases, such as Alzheimer's, Parkinson's, and Huntington's disease. Thus, PKR-associated compounds may be used to modulate lysosomal function and treat various PKR associated diseases, including Alzheimer disease, Parkinson disease, and Huntington disease. PKR-associated compounds may inhibit PKR, increase the excitability of brain cells, and enhance learning and memory in a variety of behavioral tests. The compounds may be used for the treatment of Alzheimer's disease or age-associated impairment of memory.

Further, the present compounds may be used for the treatment of inflammatory diseases. PKR regulates inflammation and HMGB1 release, and plays a role in the pathogenesis of rheumatic disease. Thus, the present PKR-associated compounds may inhibit PKR-mediated inflammation and HMGB1 release in rheumatic arthritis (RA) disease.

I. PKR-ASSOCIATED COMPOUNDS

In certain embodiments, the present disclosure provides PKR-associated compounds, such as Pac 1, Pac 2, Pac1A1, and Pac1A2. "PKR-associated compounds" as used herein refer to small molecules which target PKR-mediated lysosome function.

The PKR-associated compound may be Pac 1 or N'—[(Z)-(2-Hydroxy-1-naphthyl)methylene]-1H-indole-7-carbohydrazide (ChemSpider ID: 22825799) with the molecular formula $C_{20}H_{15}N_3O_2$ and an average mass of 329.35199 Da. The structure of Pac 1 is as below:

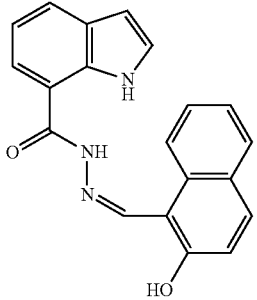 [SMILES: O=C(N/N=C\c1c(O)ccc2ccccc12)c1cccc2cc[nH]c12]

The PKR-associated compound may be Pac 2 or 1,3-benzodioxole-5-carbaldehyde [4-[(4-fluorophenyl)amino]-6-(4-morpholinyl)-1,3,5-triazin-2-yl]hydrazine. Pac 2 has the structure below:

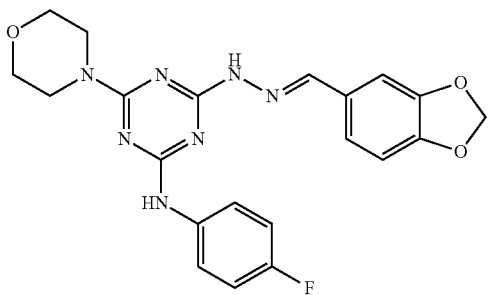 [SMILES: Fc1ccc(Nc2nc(N/N=C/c3ccc4c(c3)OCO4)nc(N3CCOCC3)n2)cc1]

The PKR-associated compound may be an analog of Pac 1, such as, but not limited to, Pac 1A1 and Pac1A2. Pac 1A1 or N'—[(Z)-(3-Allyl-2-hydroxyphenyl)methylene]-1H-indole-7-carbohydrazide (ChemSpider ID: 22812820) has the molecular formula $C_{19}H_{17}N_3O_2$ and an average mass of 319.357208 Da. Pac 1A2 or N'—[(Z)-(2-Hydroxyphenyl)methylene]-1H-indole-7-carbohydrazide (ChemSpider ID: 22812819) has the molecular formula $C_{16}H_{13}N_3O_2$ and an average mass of 279.293304 Da. The structure of Pac 1A1 is:

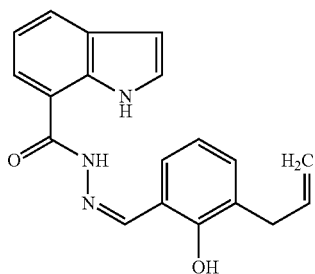 [SMILES: C=CCc1cccc(/C=N\NC(=O)c2cccc3cc[nH]c23)c1O]

The structure of Pac 1A2 is as depicted below:

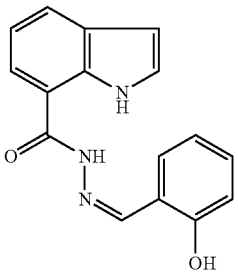 [SMILES: O=C(N/N=C\c1ccccc1O)c1cccc2cc[nH]c12]

The compounds described herein may contain one or more asymmetrically-substituted carbon or nitrogen atoms, and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present disclosure can have the (S) or the (R) configuration.

Chemical formulas used to represent the compounds described herein will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds described herein are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

The compounds described herein may also exist in prodrug form. Since prodrugs are known to enhance numerous desirable qualities of pharmaceuticals (e.g., solubility, bioavailability, manufacturing, etc.), the compounds employed in some methods of the disclosure may, if desired, be delivered in prodrug form. Thus, the disclosure contemplates prodrugs of compounds of the present disclosure as well as methods of delivering prodrugs. Prodrugs of the compounds described herein may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a subject, cleaves to form a hydroxy, amino, or carboxylic acid, respectively.

It should be recognized that the particular anion or cation forming a part of any salt form of a compound provided herein is not critical, so long as the salt, as a whole, is pharmacologically acceptable. Additional examples of pharmaceutically acceptable salts and their methods of preparation and use are presented in *Handbook of Pharmaceutical Salts: Properties, and Use* (2002), which is incorporated herein by reference.

Those skilled in the art of organic chemistry will appreciate that many organic compounds can form complexes with solvents in which they are reacted or from which they are precipitated or crystallized. These complexes are known as "solvates." For example, a complex with water is known as a "hydrate." Solvates of the compounds described herein are within the scope of the disclosure. It will also be appreciated by those skilled in organic chemistry that many organic compounds can exist in more than one crystalline form. For example, crystalline form may vary from solvate to solvate. Thus, all crystalline forms of the compounds described herein are within the scope of the present disclosure.

A. Formulations

In some embodiments of the present disclosure, the compounds are included a pharmaceutical formulation. Materials for use in the preparation of microspheres and/or microcapsules are, e.g., biodegradable/bioerodible polymers such as polygalactin, poly-(isobutyl cyanoacrylate), poly(2-hydroxyethyl-L-glutamine) and, poly(lactic acid). Biocompatible carriers that may be used when formulating a controlled release parenteral formulation are carbohydrates (e.g., dextrans), proteins (e.g., albumin), lipoproteins, or antibodies. Materials for use in implants can be non-biodegradable (e.g., polydimethyl siloxane) or biodegradable (e.g., poly(caprolactone), poly(lactic acid), poly(glycolic acid) or poly(ortho esters) or combinations thereof).

Formulations for oral use include tablets containing the active ingredient(s) (e.g., the compounds described herein) in a mixture with non-toxic pharmaceutically acceptable excipients. Such formulations are known to the skilled artisan. Excipients may be, for example, inert diluents or fillers (e.g., sucrose, sorbitol, sugar, mannitol, microcrystalline cellulose, starches including potato starch, calcium carbonate, sodium chloride, lactose, calcium phosphate, calcium sulfate, or sodium phosphate); granulating and disintegrating agents (e.g., cellulose derivatives including microcrystalline cellulose, starches including potato starch, croscarmellose sodium, alginates, or alginic acid); binding agents (e.g., sucrose, glucose, sorbitol, acacia, alginic acid, sodium alginate, gelatin, starch, pregelatinized starch, microcrystalline cellulose, magnesium aluminum silicate, carboxymethylcellulose sodium, methylcellulose, hydroxypropyl methylcellulose, ethylcellulose, polyvinylpyrrolidone, or polyethylene glycol); and lubricating agents, glidants, and anti-adhesives (e.g., magnesium stearate, zinc stearate, stearic acid, silicas, hydrogenated vegetable oils, or talc). Other pharmaceutically acceptable excipients can be colorants, flavoring agents, plasticizers, humectants, buffering agents, and the like.

The tablets may be uncoated or they may be coated by known techniques, optionally to delay disintegration and absorption in the gastrointestinal tract and thereby providing a sustained action over a longer period. The coating may be adapted to release the active drug in a predetermined pattern (e.g., in order to achieve a controlled release formulation) or it may be adapted not to release the active drug until after passage of the stomach (enteric coating). The coating may be a sugar coating, a film coating (e.g., based on hydroxypropyl methylcellulose, methylcellulose, methyl hydroxyethylcellulose, hydroxypropylcellulose, carboxymethylcellulose, acrylate copolymers, polyethylene glycols and/or polyvinylpyrrolidone), or an enteric coating (e.g., based on methacrylic acid copolymer, cellulose acetate phthalate, hydroxypropyl methylcellulose phthalate, hydroxypropyl methylcellulose acetate succinate, polyvinyl acetate phthalate, shellac, and/or ethylcellulose). Furthermore, a time delay material, such as, e.g., glyceryl monostearate or glyceryl distearate may be employed.

B. Cell Targeting Moieties

In some aspects, the present disclosure provides compounds conjugated directly or through linkers to a cell targeting moiety. In some embodiments, the conjugation of the compound to a cell targeting moiety increases the efficacy of the compound in treating a disease or disorder. Cell targeting moieties according to the embodiments may be, for example, an antibody, a growth factor, a hormone, a peptide, an aptamer, a small molecule such as a hormone, an imaging agent, or cofactor, or a cytokine. For instance, a cell targeting moiety according the embodiments may bind to a liver cancer cell such as a Hep3B cell. It has been demonstrated that the gp240 antigen is expressed in a variety of melanomas but not in normal tissues. Thus, in some embodiments, the compounds of the present disclosure may be used in conjugates with an antibody for a specific antigen that is expressed by a cancer cell but not in normal tissues.

In certain additional embodiments, it is envisioned that cancer cell targeting moieties bind to multiple types of cancer cells. For example, the 8H9 monoclonal antibody and the single chain antibodies derived therefrom bind to a glycoprotein that is expressed on breast cancers, sarcomas and neuroblastomas. Another example is the cell targeting agents that bind to MUC-1, an antigen that is expressed on a variety cancer types. Thus, it will be understood that in certain embodiments, cell targeting constructs according the embodiments may be targeted against a plurality of cancer or tumor types.

Additionally, certain cell surface molecules are highly expressed in tumor cells, including hormone receptors such as human chorionic gonadotropin receptor and gonadotropin releasing hormone receptor. Therefore, the corresponding hormones may be used as the cell-specific targeting moieties in cancer therapy. Additionally, the cell targeting moiety that may be used include a cofactor, a sugar, a drug molecule, an imaging agent, or a fluorescent dye. Many cancerous cells are known to over express folate receptors and thus folic acid or other folate derivatives may be used as conjugates to trigger cell-specific interaction between the conjugates of the present disclosure and a cell.

Since a large number of cell surface receptors have been identified in hematopoietic cells of various lineages, ligands or antibodies specific for these receptors may be used as cell-specific targeting moieties. IL-2 may also be used as a cell-specific targeting moiety in a chimeric protein to target IL-2R+ cells. Alternatively, other molecules such as B7-1, B7-2 and CD40 may be used to specifically target activated T cells. Furthermore, B cells express CD19, CD40 and IL-4 receptor and may be targeted by moieties that bind these receptors, such as CD40 ligand, IL-4, IL-5, IL-6 and CD28. The elimination of immune cells such as T cells and B cells is particularly useful in the treatment of lymphoid tumors.

Other cytokines that may be used to target specific cell subsets include the interleukins (IL-1 through IL-15), granulocyte-colony stimulating factor, macrophage-colony stimulating factor, granulocyte-macrophage colony stimulating factor, leukemia inhibitory factor, tumor necrosis factor, transforming growth factor, epidermal growth factor, insulin-like growth factors, and/or fibroblast growth factor (Thompson (ed.), 1994, The Cytokine Handbook, Academic Press, San Diego). In some aspects, the targeting polypeptide is a cytokine that binds to the Fn14 receptor, such as TWEAK.

A skilled artisan recognizes that there are a variety of known cytokines, including hematopoietins (four-helix bundles) [such as EPO (erythropoietin), IL-2 (T-cell growth factor), IL-3 (multicolony CSF), IL-4 (BCGF-1, BSF-1), IL-5 (BCGF-2), IL-6 IL-4 (IFN-β2, BSF-2, BCDF), IL-7, IL-8, IL-9, IL-11, IL-13 (P600), G-CSF, IL-15 (T-cell growth factor), GM-CSF (granulocyte macrophage colony stimulating factor), OSM (OM, oncostatin M), and LIF (leukemia inhibitory factor)]; interferons [such as IFN-γ, IFN-α, and IFN-β); immunoglobin superfamily (such as B7.1 (CD80), and B7.2 (B70, CD86)]; TNF family [such as TNF-α (cachectin), TNF-β (lymphotoxin, LT, LT-α), LT-β, CD40 ligand (CD40L), Fas ligand (FasL), CD27 ligand (CD27L), CD30 ligand (CD30L), and 4-1BBL)]; and those unassigned to a particular family [such as TGF-β, IL 1α, IL-1β, IL-1 RA, IL-10 (cytokine synthesis inhibitor F), IL-12 (NK cell stimulatory factor), MIF, IL-16, IL-17 (mCTLA-8), and/or IL-18 (IGIF, interferon-γ inducing factor)]. Furthermore, the Fc portion of the heavy chain of an antibody may be used to target Fc receptor-expressing cells such as the use of the Fc portion of an IgE antibody to target mast cells and basophils.

Furthermore, in some aspects, the cell-targeting moiety may be a peptide sequence or a cyclic peptide. Examples, cell- and tissue-targeting peptides that may be used according to the embodiments are provided, for instance, in U.S. Pat. Nos. 6,232,287; 6,528,481; 7,452,964; 7,671,010; 7,781,565; 8,507,445; and 8,450,278, each of which is incorporated herein by reference.

Thus, in some embodiments, cell targeting moieties are antibodies or avimers. Antibodies and avimers can be generated against virtually any cell surface marker thus, providing a method for targeted to delivery of GrB to virtually any cell population of interest. Methods for generating antibodies that may be used as cell targeting moieties are detailed below. Methods for generating avimers that bind to a given cell surface marker are detailed in U.S. Patent Publications Nos. 2006/0234299 and 2006/0223114, each incorporated herein by reference.

Additionally, it is contemplated that the compounds described herein may be conjugated to a nanoparticle or other nanomaterial. Some non-limiting examples of nanoparticles include metal nanoparticles such as gold or silver nanoparticles or polymeric nanoparticles such as poly-L-lactic acid or poly(ethylene) glycol polymers. Nanoparticles and nanomaterials which may be conjugated to the instant compounds include those described in U.S. Patent Publications Nos. 2006/0034925, 2006/0115537, 2007/0148095, 2012/0141550, 2013/0138032, and 2014/0024610 and PCT Publication No. 2008/121949, 2011/053435, and 2014/087413, each incorporated herein by reference.

II. METHODS OF USE

Certain embodiments of the present disclosure concern methods for the use of the PKR-associated compounds provided herein for treating or preventing a disease or disorder, such as cancer, neurodegenerative diseases, or an inflammatory disorder. The method includes administering to the subject a therapeutically effective amount of the PKR-associated compound, thereby treating or preventing the disease or disorder in the subject.

PKR positive or negative cancer patients may be administered Pac 1 or Pac 2, or analogs thereof. Various cancer including lung cancer, breast cancer, colon cancer, cervical cancer, leukemia patients may be treated. Drug and radiation resistant cancer patients may be administered Pac 1. PKR associated neurodegenerative diseases patients may also be administered the present compounds. Further, Rheumatoid arthritis (RA) disease patients or patient with memory-loss may be administered the present compounds.

"Treating" or treatment of a disease or condition refers to executing a protocol, which may include administering one or more drugs to a patient, in an effort to alleviate signs or symptoms of the disease. Desirable effects of treatment include decreasing the rate of disease progression, ameliorating or palliating the disease state, and remission or improved prognosis. Alleviation can occur prior to signs or symptoms of the disease or condition appearing, as well as after their appearance. Thus, "treating" or "treatment" may include "preventing" or "prevention" of disease or undesirable condition. In addition, "treating" or "treatment" does not require complete alleviation of signs or symptoms, does not require a cure, and specifically includes protocols that have only a marginal effect on the patient.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the size of a tumor, a reduction in the invasiveness of a tumor, reduction in the growth rate of the cancer, or prevention of metastasis. Treatment of cancer may also refer to prolonging survival of a subject with cancer.

Cancer cells that may be treated with the compounds of the present disclosure include but are not limited to cells from the bladder, blood, bone, bone marrow, brain, breast, colon, esophagus, gastrointestine, gum, head, kidney, liver, lung, nasopharynx, neck, ovary, prostate, skin, stomach, pancreas, testis, tongue, cervix, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; Paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; Leydig cell tumor, malignant; lipid cell tumor, malignant; paraganglioma, malignant; extramammary paraganglioma, malignant; pheochromocytoma;

glomangiosarcoma; malignant melanoma; amelanotic melanoma; superficial spreading melanoma; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; Mullerian mixed tumor; nephroblastoma; hepatoblastoma; carcinosarcoma; mesenchymoma, malignant; Brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; Kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; Ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin's disease; paragranuloma; malignant lymphoma, small lymphocytic; malignant lymphoma, large cell, diffuse; malignant lymphoma, follicular; mycosis fungoides; other specified non-Hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia. In certain aspects, the tumor may comprise an osteosarcoma, angiosarcoma, rhabdosarcoma, leiomyosarcoma, Ewing sarcoma, glioblastoma, neuroblastoma, or leukemia.

In one embodiment, the subject has an inflammatory condition or autoimmune disease. Non-limiting examples of inflammatory diseases include: alopecia areata, ankylosing spondylitis, antiphospholipid syndrome, autoimmune Addison's disease, autoimmune diseases of the adrenal gland, autoimmune hemolytic anemia, autoimmune hepatitis, autoimmune oophoritis and orchitis, autoimmune thrombocytopenia, Behcet's disease, bullous pemphigoid, cardiomyopathy, celiac spate-dermatitis, chronic fatigue immune dysfunction syndrome (CFIDS), chronic inflammatory demyelinating polyneuropathy, Churg-Strauss syndrome, cicatrical pemphigoid, CREST syndrome, cold agglutinin disease, Crohn's disease, discoid lupus, essential mixed cryoglobulinemia, fibromyalgia-fibromyositis, glomerulonephritis, Graves' disease, Guillain-Barre, Hashimoto's thyroiditis, idiopathic pulmonary fibrosis, idiopathic thrombocytopenia purpura (ITP), IgA neuropathy, juvenile arthritis, lichen planus, lupus erythematosus, Meniere's disease, mixed connective tissue disease, multiple sclerosis, type 1 or immune-mediated diabetes mellitus, myasthenia gravis, nephrotic syndrome (such as minimal change disease, focal glomerulosclerosis, or membranous nephropathy), pemphigus vulgaris, pernicious anemia, polyarteritis nodosa, polychondritis, polyglandular syndromes, polymyalgia rheumatica, polymyositis and dermatomyositis, primary agammaglobulinemia, primary biliary cirrhosis, psoriasis, psoriatic arthritis, Raynaud's phenomenon, Reiter's syndrome, Rheumatoid arthritis, sarcoidosis, scleroderma, Sjogren's syndrome, stiff-man syndrome, systemic lupus erythematosus, lupus erythematosus, ulcerative colitis, uveitis, vasculitides (such as polyarteritis nodosa, takayasu arteritis, temporal arteritis/giant cell arteritis, or dermatitis herpetiformis vasculitis), vitiligo, and Wegener's granulomatosis. Thus, some examples of an autoimmune disease that can be treated using the methods disclosed herein include, but are not limited to, multiple sclerosis, rheumatoid arthritis, systemic lupus erythematosus, type I diabetes mellitus, Crohn's disease; ulcerative colitis, myasthenia gravis, glomerulonephritis, ankylosing spondylitis, vasculitis, or psoriasis.

The term "neurodegenerative disease or disorder" and "neurological disorders" encompass a disease or disorder in which the peripheral nervous system or the central nervous system is principally involved. The compounds, compositions, and methods provided herein may be used in the treatment of neurological or neurodegenerative diseases and disorders. As used herein, the terms "neurodegenerative disease", "neurodegenerative disorder", "neurological disease", and "neurological disorder" are used interchangeably.

Examples of neurological disorders or diseases include, but are not limited to chronic neurological diseases such as diabetic peripheral neuropathy (including third nerve palsy, mononeuropathy, mononeuropathy multiplex, diabetic amyotrophy, autonomic neuropathy and thoracoabdominal neuropathy), Alzheimer's disease, age-related memory loss, senility, age-related dementia, Pick's disease, diffuse Lewy body disease, progressive supranuclear palsy (Steel-Richardson syndrome), multisystem degeneration (Shy-Drager syndrome), motor neuron diseases including amyotrophic lateral sclerosis ("ALS"), degenerative ataxias, cortical basal degeneration, ALS-Parkinson's-Dementia complex of Guam, subacute sclerosing panencephalitis, Huntington's disease, Parkinson's disease, multiple sclerosis ("MS"), synucleinopathies, primary progressive aphasia, striatonigral degeneration, Machado-Joseph disease/spinocerebellar ataxia type 3 and olivopontocerebellar degenerations, Gilles De La Tourette's disease, bulbar and pseudobulbar palsy, spinal and spinobulbar muscular atrophy (Kennedy's disease), primary lateral sclerosis, familial spastic paraplegia, Wernicke-Korsakoff's related dementia (alcohol induced dementia), Werdnig-Hoffmann disease, Kugelberg-Welander disease, Tay-Sach's disease, Sandhoff disease, familial spastic disease, Wohlfart-Kugelberg-Welander disease, spastic paraparesis, progressive multifocal leukoencephalopathy, and prion diseases (including Creutzfeldt-Jakob, Gerstmann-Straussler-Scheinker disease, Kuru and fatal familial insomnia). Other conditions also included within the methods of the present disclosure include age-related dementia and other dementias, and conditions with memory loss including vascular dementia, diffuse white matter disease (Binswanger's disease), dementia of endocrine or metabolic origin, dementia of head trauma and diffuse brain damage, dementia pugilistica, and frontal lobe dementia. Also other neurodegenerative disorders resulting from cerebral ischemia or infarction including embolic occlusion and thrombotic occlusion as well as intracranial hemorrhage of any type (including, but not limited to, epidural, subdural, subarachnoid, and intracerebral), and intracranial and intravertebral lesions (including, but not limited to, contusion, penetration, shear, compression, and laceration). Thus, the term also encompasses acute neurodegenerative disorders such as those involving stroke, traumatic brain injury, schizophrenia, peripheral nerve damage, hypoglycemia, spinal cord injury, epilepsy, and anoxia and hypoxia.

In some embodiments, the neurodegenerative disorder is amyloidosis. Amyloidosis is observed in Alzheimer's Disease, hereditary cerebral angiopathy, nonneuropathic hereditary amyloid, Down's syndrome, macroglobulinemia, secondary familial Mediterranean fever, Muckle-Wells syndrome, multiple myeloma, pancreatic- and cardiac-related amyloidosis, chronic hemodialysis arthropathy, and Finnish and Iowa amyloidosis.

A. Pharmaceutical Formulations and Routes of Administration

Where clinical applications are contemplated, it will be necessary to prepare pharmaceutical compositions in a form appropriate for the intended application. In some embodiments, such formulation with the compounds of the present disclosure is contemplated. Generally, this will entail preparing compositions that are essentially free of pyrogens, as well as other impurities that could be harmful to humans or animals.

One will generally desire to employ appropriate salts and buffers to render delivery vectors stable and allow for uptake by target cells. Buffers also will be employed when recombinant cells are introduced into a patient. Aqueous compositions of the present disclosure comprise an effective amount of the vector to cells, dissolved or dispersed in a pharmaceutically acceptable carrier or aqueous medium. Such compositions also are referred to as inocula. The phrase "pharmaceutically or pharmacologically acceptable" refers to molecular entities and compositions that do not produce adverse, allergic, or other untoward reactions when administered to an animal or a human. As used herein, "pharmaceutically acceptable carrier" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the vectors or cells of the present disclosure, its use in therapeutic compositions is contemplated. Supplementary active ingredients also can be incorporated into the compositions.

The active compositions of the present disclosure may include classic pharmaceutical preparations. Administration of these compositions according to the present disclosure will be via any common route so long as the target tissue is available via that route. Such routes include oral, nasal, buccal, rectal, vaginal or topical route. Alternatively, administration may be by orthotopic, intradermal, subcutaneous, intramuscular, intratumoral, intraperitoneal, or intravenous injection. Such compositions would normally be administered as pharmaceutically acceptable compositions, described supra.

The active compounds may also be administered parenterally or intraperitoneally. Solutions of the active compounds as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

As used herein, "pharmaceutically acceptable carrier" includes any and all solvents, dispersion media, coatings, antibacterial and antifungal agents, isotonic and absorption delaying agents and the like. The use of such media and agents for pharmaceutical active substances is well known in the art. Except insofar as any conventional media or agent is incompatible with the active ingredient, its use in the therapeutic compositions is contemplated. Supplementary active ingredients can also be incorporated into the compositions.

For oral administration the compounds described herein may be incorporated with excipients and used in the form of non-ingestible mouthwashes and dentifrices. A mouthwash may be prepared incorporating the active ingredient in the required amount in an appropriate solvent, such as a sodium borate solution (Dobell's Solution). Alternatively, the active ingredient may be incorporated into an antiseptic wash containing sodium borate, glycerin and potassium bicarbonate. The active ingredient may also be dispersed in dentifrices, including: gels, pastes, powders and slurries. The active ingredient may be added in a therapeutically effective amount to a paste dentifrice that may include water, binders, abrasives, flavoring agents, foaming agents, and humectants.

The compositions of the present disclosure may be formulated in a neutral or salt form. Pharmaceutically-acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

Upon formulation, solutions will be administered in a manner compatible with the dosage formulation and in such amount as is therapeutically effective. The formulations are easily administered in a variety of dosage forms such as injectable solutions, drug release capsules and the like. For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. For example, one dosage could be dissolved in 1 ml of isotonic NaCl solution and either added to 1000 mL of hypodermoclysis fluid or injected at the proposed site of infusion, (see for example, "Remington's Pharmaceutical Sciences," 15th Edition, pages 1035-1038 and 1570-1580). Some variation in dosage will necessarily occur depending on the condition of the subject being treated. The person responsible for administration will, in any event, determine the appropriate dose for the individual subject. Moreover, for human administration, preparations should meet sterility, pyrogenicity, and general safety and purity standards as required by the appropriate regulatory agencies for the safety of pharmaceutical agents.

In particular, the compositions that may be used in treating cancer in a subject (e.g., a human subject) are disclosed herein. The compositions described above are preferably administered to a mammal (e.g., rodent, human, non-human primates, canine, bovine, ovine, equine, feline, etc.) in an effective amount, that is, an amount capable of producing a desirable result in a treated subject (e.g., causing apoptosis of cancerous cells). Toxicity and therapeutic efficacy of the compositions utilized in methods of the disclosure can be determined by standard pharmaceutical procedures. As is well known in the medical and veterinary arts, dosage for any one animal depends on many factors, including the subject's size, body surface area, body weight, age, the particular composition to be administered, time and route of administration, general health, the clinical symptoms of the infection or cancer and other drugs being administered concurrently. A composition as described herein is typically administered at a dosage that induces death of cancerous cells (e.g., induces apoptosis of a cancer cell), as assayed by identifying a reduction in hematological parameters (complete blood count—CBC), or cancer cell growth or proliferation. In some embodiments, amounts of the compounds used to induce apoptosis of the cancer cells is calculated to be from about 0.01 mg to about 10,000 mg/day. In some embodiments, the amount is from about 1 mg to about 1,000 mg/day. In some embodiments, these dosings may be reduced or increased based upon the biological factors of a particular patient such as increased or decreased metabolic breakdown of the drug or decreased uptake by the digestive tract if administered orally. Additionally, the compounds may be more efficacious and thus a smaller dose is required to achieve a similar effect. Such a dose is typically administered once a day for a few weeks or until sufficient reducing in cancer cells has been achieved.

The therapeutic methods of the disclosure (which include prophylactic treatment) in general include administration of a therapeutically effective amount of the compositions described herein to a subject in need thereof, including a mammal, particularly a human. Such treatment will be suitably administered to subjects, particularly humans, suffering from, having, susceptible to, or at risk for a disease, disorder, or symptom thereof. Determination of those subjects "at risk" can be made by any objective or subjective determination by a diagnostic test or opinion of a subject or health care provider (e.g., genetic test, enzyme or protein marker, marker (as defined herein), family history, and the like).

B. Combination Therapies

Certain embodiments of the present disclosure provide for the administration or application of one or more secondary forms of therapies for the treatment or prevention of a disease. For example, the disease may be a hyperproliferative disease, such as cancer.

The secondary form of therapy may be administration of one or more secondary pharmacological agents that can be applied in the treatment or prevention of cancer. If the secondary therapy is a pharmacological agent, it may be administered prior to, concurrently, or following administration of the present compounds.

The interval between the administration of the present compounds and the secondary therapy may be any interval as determined by those of ordinary skill in the art. For example, the interval may be minutes to weeks. In embodiments where the agents are separately administered, one would generally ensure that a long period of time did not expire between the time of each delivery, such that each therapeutic agent would still be able to exert an advantageously combined effect on the subject. For example, the interval between therapeutic agents may be about 12 h to about 24 h of each other and, more preferably, within about 6 hours to about 12 h of each other. In some situations, the time period for treatment may be extended, however, where several days (2, 3, 4, 5, 6 or 7) to several weeks (1, 2, 3, 4, 5, 6, 7 or 8) lapse between the respective administrations. In some embodiments, the timing of administration of a secondary therapeutic agent is determined based on the response of the subject to the nanoparticles.

Various combinations may be employed. For the example below a PKR-associated compound is "A" and an anticancer therapy is "B":

A/B/A B/A/B B/B/A A/A/B A/B/B B/A/A A/B/B/B B/A/B/B
B/B/B/A B/B/A/B A/A/B/B A/B/A/B A/B/B/A B/B/A/A
B/A/B/A B/A/A/B A/A/A/B B/A/A/A A/B/A/A A/A/B/A

Administration of any compound or therapy of the present disclosure to a patient will follow general protocols for the administration of such compounds, taking into account the toxicity, if any, of the agents. Therefore, in some embodiments there is a step of monitoring toxicity that is attributable to combination therapy. It is expected that the treatment cycles may be repeated. It also is contemplated that various standard therapies, as well as surgical intervention, may be applied in combination with the described therapy.

In specific aspects, it is contemplated that a standard therapy will include chemotherapy, radiotherapy, immunotherapy, surgical therapy or gene therapy and may be employed in combination with the inhibitor of gene expression therapy, anticancer therapy, or both the inhibitor of gene expression therapy and the anti-cancer therapy, as described herein.

1. Chemotherapy

A wide variety of chemotherapeutic agents may be used in accordance with the present embodiments. Examples of chemotherapeutic agents include alkylating agents, such as thiotepa and cyclophosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gamma1I and calicheamicin omega1I); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dronanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein tansferase inhibitors, transplatinum, and pharmaceutically acceptable salts, acids, or derivatives of any of the above.

2. Radiotherapy

Other factors that cause DNA damage and have been used extensively include what are known as y-rays, X-rays, and/or the directed delivery of radioisotopes to tumor cells. Other forms of DNA damaging factors are also contemplated, such as microwaves, proton beam irradiation, and UV-irradiation. It is likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

3. Immunotherapy

The skilled artisan will understand that additional immunotherapies may be used in combination or in conjunction with methods of the embodiments. In the context of cancer treatment, immunotherapeutics, may rely on the use of immune effector cells and molecules to target and destroy cancer cells. Rituximab (RITUXAN®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve as a targeting agent. Alternatively, the effector may be a lymphocyte carrying a surface molecule that interacts, either directly or indirectly, with a tumor cell target. Various effector cells include cytotoxic T cells and NK cells In one aspect of immunotherapy, the tumor cell may bear some marker that is amenable to targeting, i.e., is not present on the majority of other cells. Many tumor markers exist and any of these may be suitable for targeting in the context of the present embodiments. Common tumor markers include CD20, carcinoembryonic antigen, tyrosinase (p9'7), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies that may be used are immune adjuvants, e.g., *Mycobacterium bovis, Plasmodium falciparum*, dinitrochlorobenzene, and aromatic compounds; cytokine therapy, e.g., interferons α, β, and γ, IL-1, GM-CSF, and TNF; gene therapy, e.g., TNF, IL-1, IL-2, and p53; and monoclonal antibodies, e.g., anti-CD20, anti-ganglioside GM2, and anti-p185. It is contemplated that one or more anti-cancer therapies may be employed with the antibody therapies described herein.

In some embodiments, the immunotherapy may be an immune checkpoint inhibitor. Immune checkpoints are molecules in the immune system that either turn up a signal (e.g., co-stimulatory molecules) or turn down a signal. Inhibitory checkpoint molecules that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies. Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present disclosure. For example it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO®, is an anti-PD-1 antibody described in WO2006/121168. Pembrolizumab, also known as MK-3475, Merck 3475, lambrolizumab, KEYTRUDA®, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156, can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in U.S. Pat. No. 8,017,114; all incorporated herein by reference.

An exemplary anti-CTLA-4 antibody is ipilimumab (also known as 10D1, MDX-010, MDX-101, and Yervoy®) or antigen binding fragments and variants thereof. In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. U.S. Pat. Nos. 5,844,905, 5,885,796 and International Patent Application Nos. WO1995001994 and WO1998042752; all incorporated herein by reference, and immunoadhesions such as described in U.S. Pat. No. 8,329,867, incorporated herein by reference.

4. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

5. Other Agents

It is contemplated that other agents may be used in combination with certain aspects of the present embodiments to improve the therapeutic efficacy of treatment. Further examples can therefore be contemplated. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

III. KITS

In some embodiments, a kit that can include, for example, one or more PKR-associated compounds (e.g., Pac 1 or Pac 2) is provided. The reagent system may be packaged either in aqueous media or in lyophilized form, where appropriate. The container means of the kits will generally include at least one vial, test tube, flask, bottle, syringe or other container means, into which a component may be placed, and preferably, suitably aliquoted. Where there is more than one component in the kit, the kit also will generally contain a second, third or other additional container into which the additional components may be separately placed. However, various combinations of components may be comprised in a vial. The components of the kit may be provided as dried powder(s). When reagents and/or components are provided as a dry powder, the powder can be reconstituted by the addition of a suitable solvent. It is envisioned that the solvent may also be provided in another container means. The kits also will typically include a means for containing the kit component(s) in close confinement for commercial sale. Such containers may include injection or blow molded plastic containers into which the desired vials are retained. The kit can also include instructions for use, such as in printed or electronic format, such as digital format.

The kit may further include an instruction sheet that outlines the procedural steps of the methods set forth herein, and will follow substantially the same procedures as described herein or are known to those of ordinary skill in the art. The instruction information may be in a computer readable media containing machine-readable instructions that, when executed using a computer, cause the display of a real or virtual procedure of delivering a pharmaceutically effective amount of a therapeutic agent.

IV. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Characterization of PKR-Associated Compounds

Figure 1B:
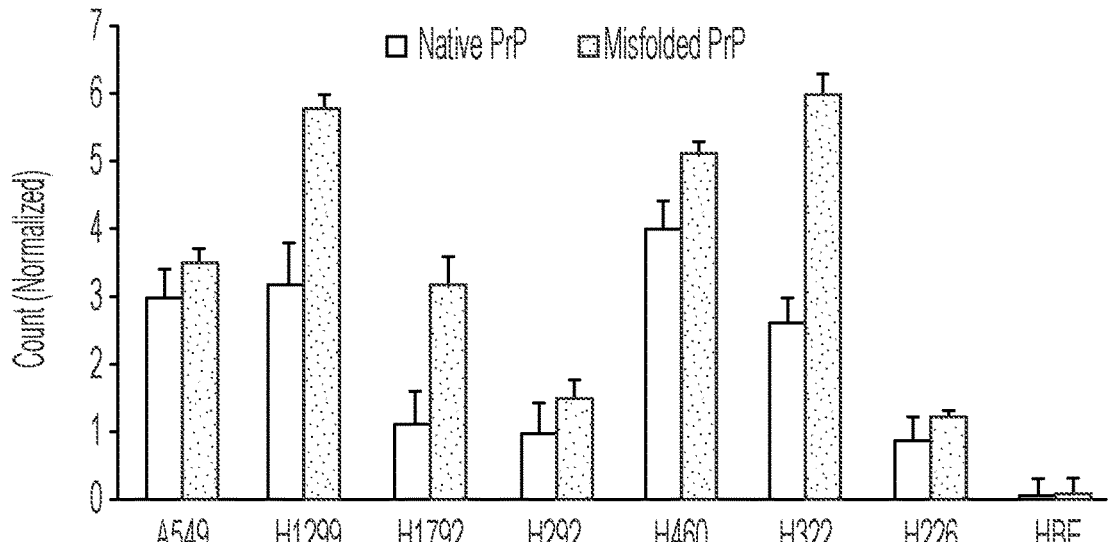
Figure 1C:
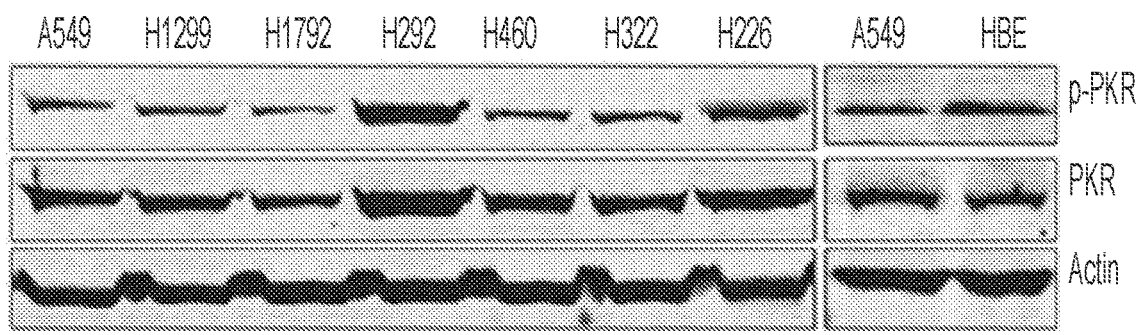
Figure 1D:
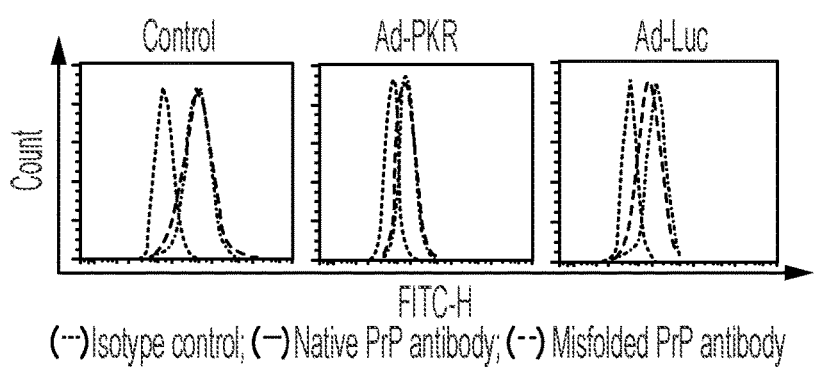
Figure 1E:
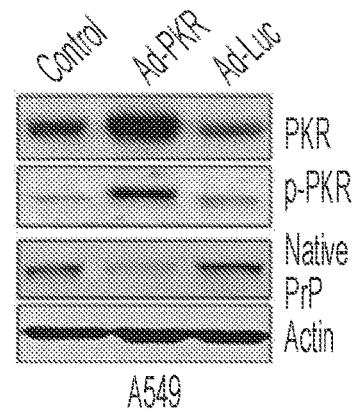
Figure 8:
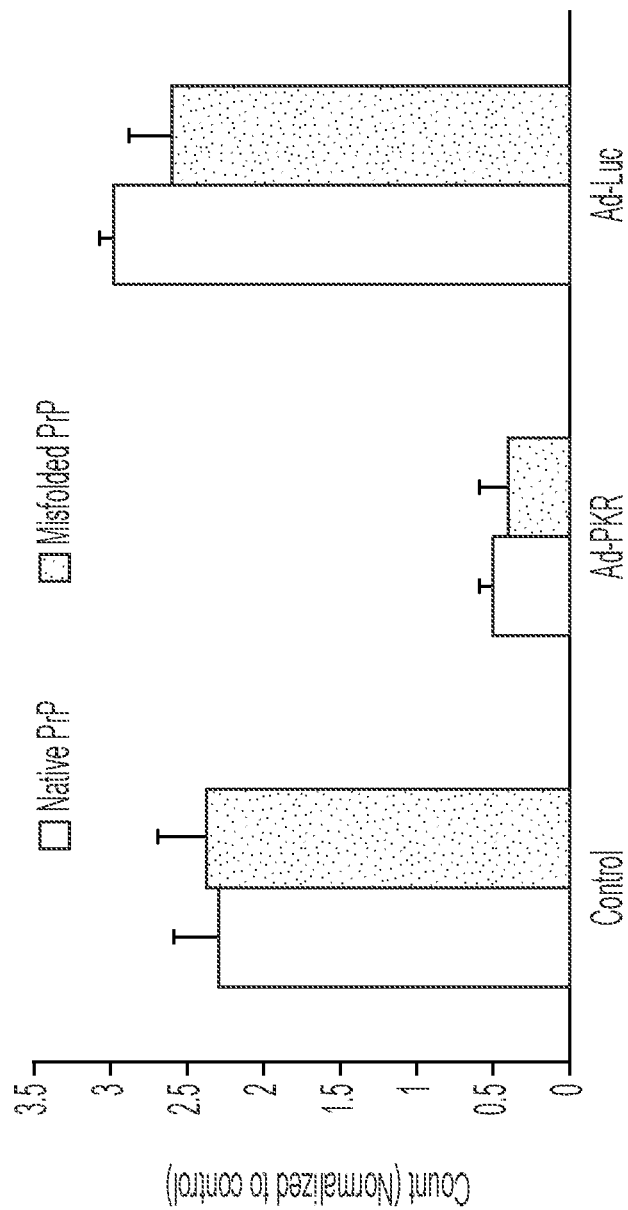
FIG. 8: Induction of PKR expression reduced misfolded PrP expression in lung cancer cells. Shown are the average numbers of native and misfolded PrPs in lung cancer cells. The native and misfolded PrP values were normalized according to the isotype control values. Experiments were performed in triplicate; data are presented as means (error bars, standard deviation).

PKR regulates misfolded prion protein clearance: To investigate the role of PKR in clearance of misfolded proteins in cancer cells, an antibody specific for misfolded prion protein (PrP) was developed. The expression of native and misfolded PrP was examined in cancer cells. Specifically, misfolded PrP expression levels were measured in seven human lung cancer cell lines and one normal human bronchial epithelial (HBE) cell line using fluorescence-activated cell sorting (FACS) with the AMF-1c-120 antibody. Native and misfolded PrPs were expressed in all cancer cell lines examined but not in normal HBE cells (FIGS. 1A and 1B). Furthermore, misfolded PrPs were much more strongly expressed than were native PrPs in those cell lines. The two cancer cell lines with the highest phosphorylated PKR (p-PKR) expression levels (H292 and H226) had lower levels of native and misfolded PrP expression than did cell lines with lower p-PKR levels (FIG. 1A-C). In A549 cells, induction of PKR expression reduced levels of native as well as misfolded PrP expression (FIGS. 1D and 8).

Figures 9, 10A:
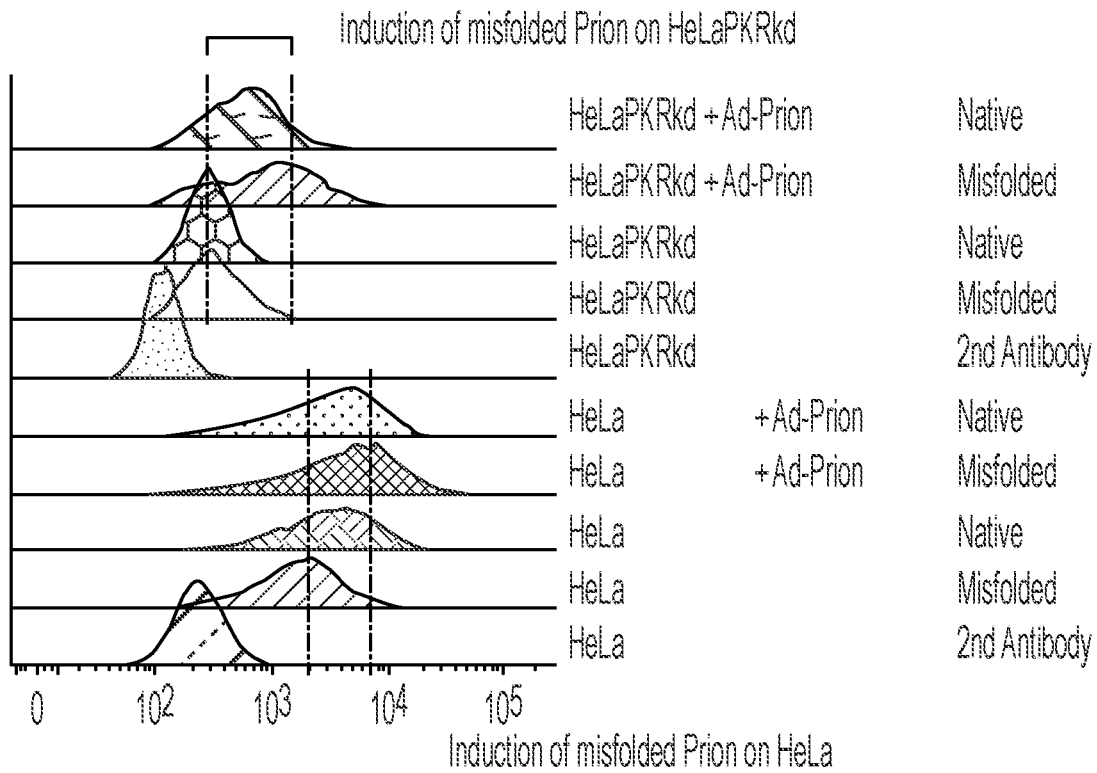
FIG. 9: PKR prevents misfolded PrP release. Shown are the results of FACS analysis of native and misfolded PrPs in HeLa and HeLaPKRkd cells 48 hours after transfection with Ad-Prion.
FIGS. 10A-10C: PKR regulates the distribution and release of misfolded PrP. A, Summary of the cellular distribution of PrPs in PKR wild-type and PKR-deficient cancer cells. B, Average exosome size as determined using a NanoSight instrument. C, TEM image of the vesicular structure of exosomes isolated from the supernatant of cultured H1299 cells.

It was next examined whether PKR regulates misfolded protein distribution and release in cancer cells. It was noted that knockdown of PKR by small interfering RNA (siRNA) caused protein aggregation, which made this technique unsuitable for examining misfolded PrPs. Therefore, it was examined how expression of PKR in cancer cells regulates misfolded PrP distribution and release (FIG. 2A). Misfolded PrP expression was induced in HeLa human cervical cancer cells and PKR-knockdown HeLa (HeLaPKRkd) cells by transfecting them with an adenoviral PrP vector (Ad-Prion). Intracellular and surface induction of native PrP expression was then analyzed using confocal microscopy and FACS. Transfection with Ad-Prion resulted in abnormal local over-expression of PrP (possibly intracellular PrP accumulation in lysosomes) in HeLa cells and surface expression of PrP in HeLaPKRkd cells (FIG. 2B). Furthermore, Ad-Prion induced higher levels of surface misfolded PrP expression in HeLaPKRkd cells than in HeLa cells (FIGS. 2C and 9).

Figure 2E:
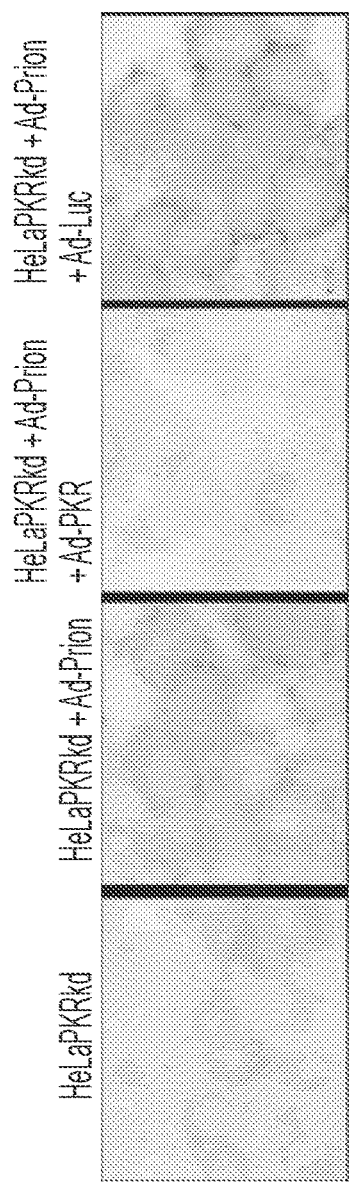
Figure 2F:
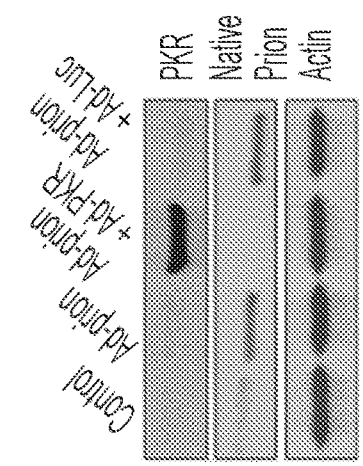

Expression of PKR, p-PKR, and intracellular PrPs was next evaluated in Ad-Prion-transfected HeLa and HeLaPKRkd cells using Western blotting. Ad-Prion transfection caused accumulation of intracellular PrP and induction of PKR and p-PKR expression in HeLa cells but not HeLaPKRkd cells, in which the amount of intracellular PrP was reduced (FIG. 2D). PrP expression was further induced in PKR-deficient HeLaPKRkd cells as well as HeLaPKRkd cells re-expressing PKR. Intracellular and surface induction of native PrP expression was analyzed using confocal microscopy. As expected, transfection with Ad-Prion resulted in surface expression of PrP in HeLaPKRkd cells (FIG. 2E). However, re-expression of PKR but not luciferase (Luc) in HeLaPKRkd cells reduced the surface expression of PrP. These data suggested that induction of low levels of intracellular PrP expression in Ad-Prion-transfected PKR-deficient cells is attributable to quick release of PrPs into the extracellular space via multivesicular bodies (MVBs)/exosomes. Also, the data demonstrated that PKR regulates the release of misfolded PrP in cancer cells. Because evidence suggests that PKR is involved in diseases associated with protein misfolding, and because lysosomes break down abnormal proteins, including misfolded proteins (10,31), it was hypothesized that PKR plays a significant role in lysosome function, and promotes misfolded protein degradation, thereby reducing the release of these proteins in cancer cells.

Figure 3A:
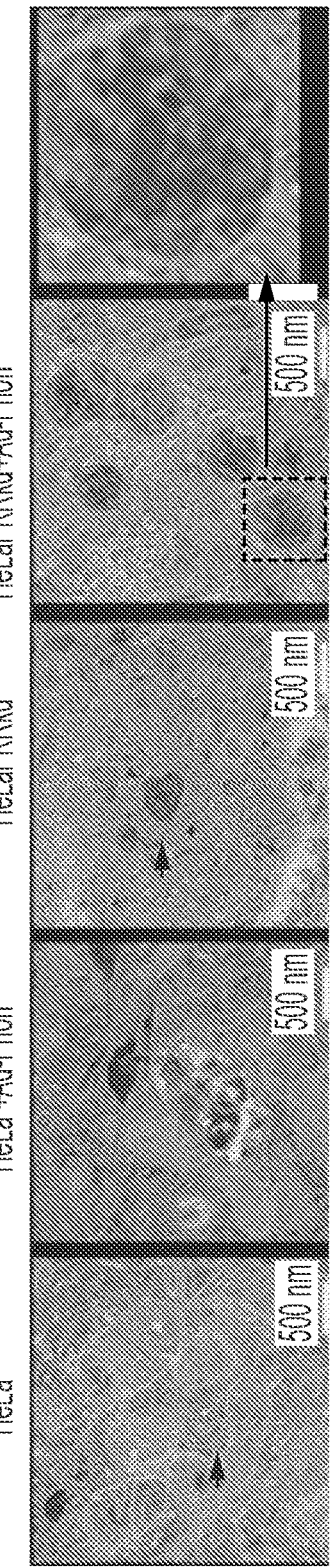
FIGS. 3A-3F: PKR is involved in lysosomal degradation of misfolded proteins. A, TEM analysis of HeLa and HeLaPKRkd cells 48 hours after transfection with Ad-Prion or without transfection. The scale bars represent 500 nm. B, Average exosome counts in HeLa and HeLaPKRkd cell media 48 hours after transfection with Ad-Prion. Experiments were performed in triplicate; data are presented as means. C, Western blot of expression of TSG101, CD81, and native PrP in exosomes in the HeLa and HeLaPKRkd cell media 48 hours after transfection with or without Ad-Prion. D, Western blot of HeLa and HeLaPKRkd cells for expression of PrP 48 hours after transfection with Ad-Prion (2500 viral particles/cell) and treatment with 3MA (1 mM). Actin was used as a loading control. E and F, Proposed mechanisms for prevention of misfolded proteins by PKR-mediated lysosome function in cancer cells.
Figure 3D:
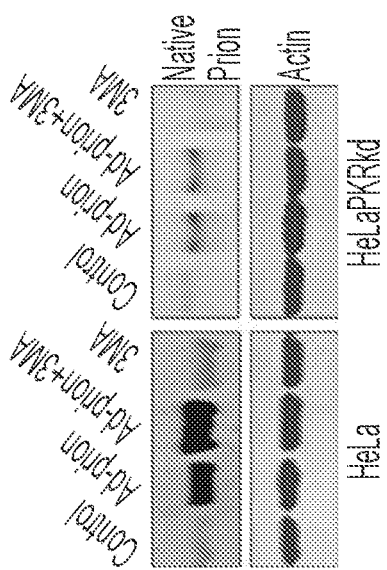
Figure 3C:
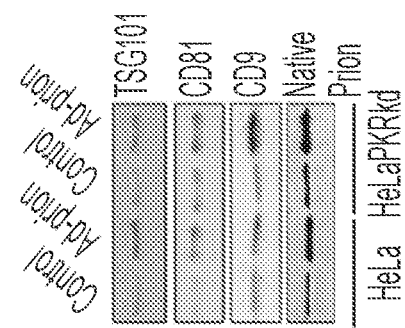
Figure 3B:
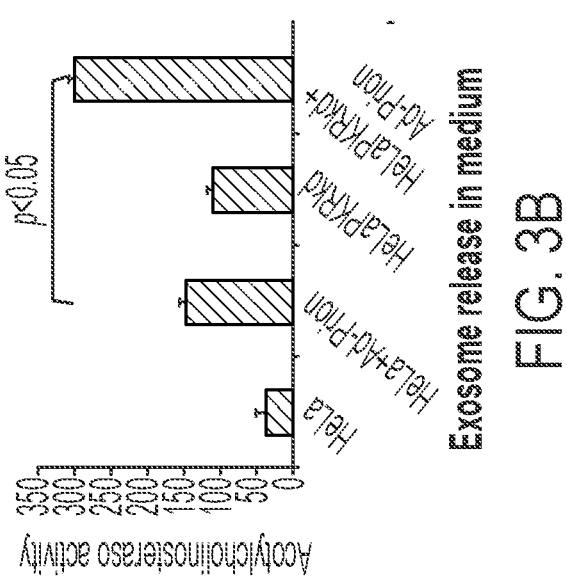
Figure 3F:
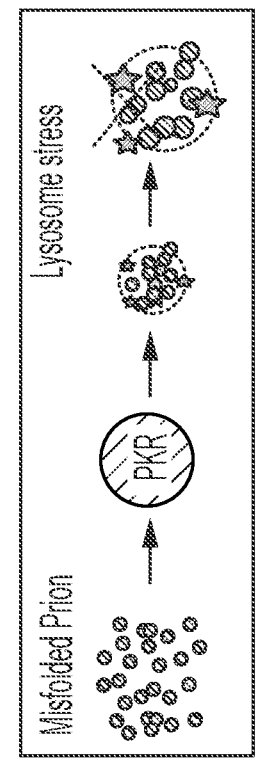
Figure 3E:
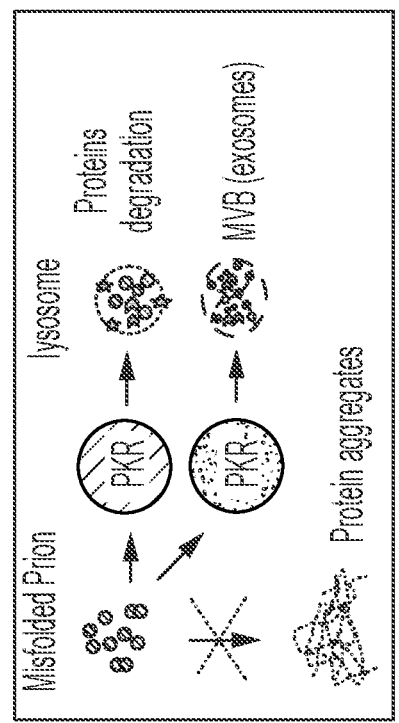
Figure 10B:
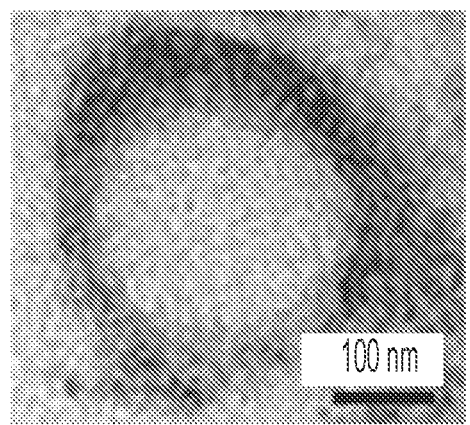
Figure 10C:
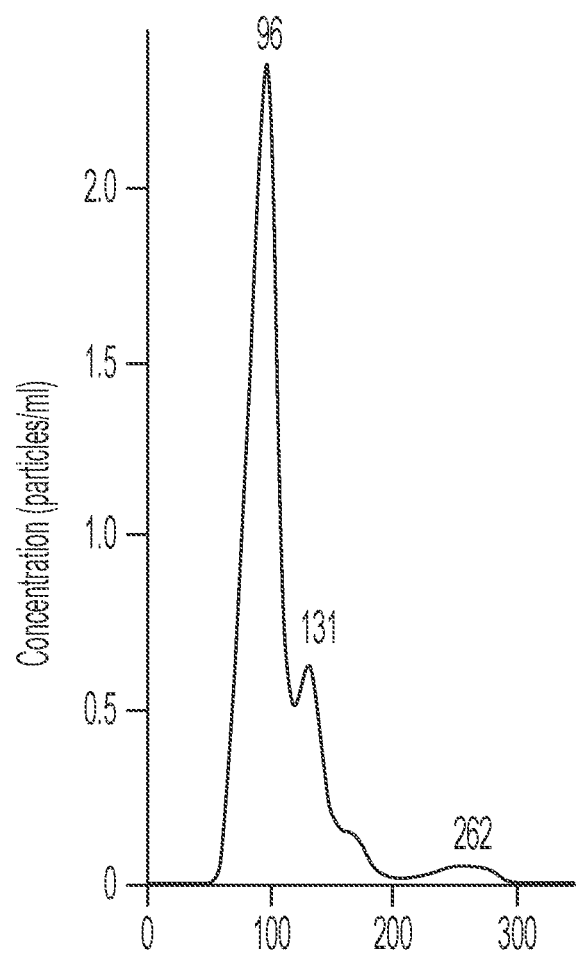

PKR regulates lysosomal degradation of misfolded prion proteins: To determine whether PKR dependent lysosome function promotes misfolded protein degradation, lysosomes were further examined in cells after induction of misfolded PrP expression using transmission electron microscopy (TEM). It was observed that HeLa cells but not HeLaPKRkd cells had lysosomes and that the latter cells had MVBs/exosomes (FIG. 3A). Ad-Prion transfection induced destruction of lysosomes in HeLa cells and increased the number of MVBs/exosomes and spurred formation of dilated MVBs in HeLaPKRkd cells. Because exosomes are rich in proteins such as acetylcholinesterase, exosomes were quantitated in the exosomal fraction by measuring the activity of acetylcholinesterase. Higher acetylcholinesterase activity was found, indicating a larger quantity of released exosomes, in the supernatant of Ad-Prion-transfected HeLaPKRkd cells than in that of Ad-Prion-transfected HeLa cells (FIG. 3B). In addition, larger quantities of PrPs and exosome markers (TSG101 and CD81) were detected in exosomes from the supernatant of Ad-Prion-transfected HeLaPKRkd cells than in that of Ad-Prion-transfected HeLa cells (FIG. 3C). It was also found that PKR wild-type and PKR-deficient cancer cells responded to the presence of misfolded PrPs differently. After transfection of PKR wild-type and PKR-deficient cells with Ad-Prion, PKR wild-type cells produced high intracellular, low surface, and low extracellular levels of PrP, whereas PKR-deficient cells produced low intracellular, high surface, and high extracellular PrP levels (FIG. 10A). The average exosome size was determined using a NanoSight instrument (Malvern Panalytical) (FIG. 10B) and the vesicular structures of exosomes isolated from the supernatant of cultured H1299 cells were analyzed using TEM (FIG. 10C). The involvement of lysosomes was next investigated in PrP degradation. HeLa and HeLaPKRkd cells were transfected with Ad-Prion for 48 hours in the presence or absence of the lysosome inhibitor 3-methyladenine (3MA; 1 mM). 3MA prevented prion degradation in HeLa cells but not in HeLaPKRkd cells (FIG. 3D). These results demonstrated that PKR contributes to lysosome function and promotes misfolded protein degradation, thereby preventing the release of these proteins in cancer cells. It was therefore proposed that 1) PKR-positive cancer cells respond to the presence of abnormal proteins such as misfolded proteins by promoting lysosome function, thereby avoiding the cell death that results from aggregation of these harmful proteins (FIG. 3E); 2) cancer cells may reduce or deplete PKR and increase the number of MVBs/exosomes to release misfolded proteins (FIG. 3E); and 3) PKR prevents misfolded protein release and that excess misfolded proteins result in their accumulation in lysosomes and cause lysosome stress and cell death (FIG. 3F). These data demonstrated that PKR is involved in lysosomal degradation of misfolded proteins and that PKR may contribute directly to lysosome function.

Figure 11A:
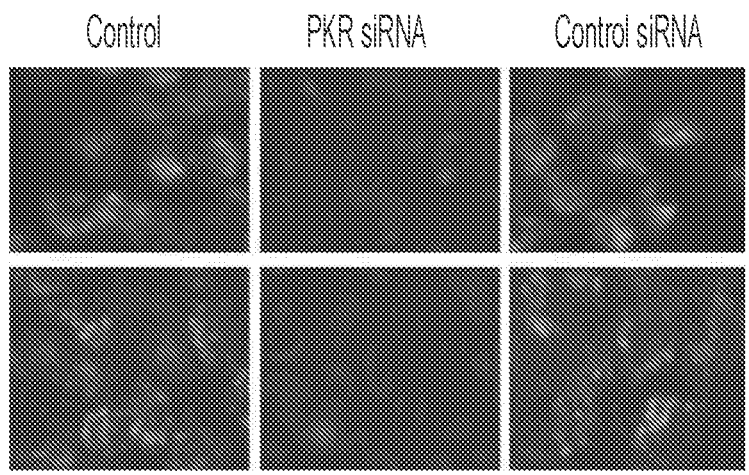
FIGS. 11A-11B: PKR-knockdown cells have impaired lysosome function. A, Microscopic images of A549 and H1299 lung cancer cells subjected to LysoTracker Red staining 48 hours after treatment with PKR or control siRNA. B, Proposed mechanism of PKR-mediated lysosome function in cancer cells.
Figure 11B:
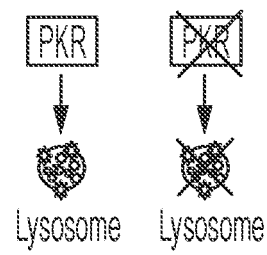

PKR contributes directly to lysosome function: To determine whether PKR contributes directly to lysosome function, this function was evaluated in PKR wild-type (HeLa) and stable PKR-knockdown (HeLaPKRkd) cells using the acidophilic dye LysoTracker Red (Life Technologies). HeLaPKRkd cells displayed markedly lower numbers of acidic vesicular organelles than did HeLa cells (FIG. 4A), suggesting the presence of a lysosomal defect or abnormality in HeLaPKRkd cells. Exposure to PKR siRNA but not control siRNA also reduced the numbers of acidic vesicular organelles in HeLa cells (FIG. 4B). TEM revealed enrichment of lysosomes (which appear as dark, small, thick-walled organelles) in HeLa cells and a lack of lysosomes but enrichment of MVBs/exosomes (which appear as small, bright, large, thin-walled internal vesicles) in HeLaPKRkd cells (FIG. 4C). A TEM study demonstrated that treatment of HeLa cells with PKR siRNA effectively damaged lysosomes but did not affect MVBs/exosomes in HeLaPKRkd cells (FIG. 4D). To further confirm abnormality or deficiency of lysosomes in HeLaPKRkd cells, a vector containing a fusion of green fluorescent protein (GFP) was transfected with the carboxyl terminus of human Lamp1 (Lamp1-GFP) in HeLa and HeLaPKRkd cells. This fusion construct is packaged in the insect virus Baculoviridae, provides accurate and specific targeting to lysosomes, and is a method for labeling lysosomes with GFP. Confocal microscopy demonstrated the expected diffuse expression of Lamp1 in HeLa cells and abnormal local overexpression (possibly aberrant aggregation) of Lamp1 in HeLaPKRkd cells (FIG. 4E). PKR siRNA but not control siRNA reduced the numbers of acidic vesicular organelles in A549 and H1299 lung cancer cells (FIG. 11A), indicating that reduction of PKR expression impaired lysosome function. Taken together, these data demonstrated that PKR is directly involved in lysosome function and that loss of PKR leads to impairment of lysosome function in cancer cells (FIG. 11B). Because PKR wild-type HeLa cells have lysosomes and PKR-deficient HeLaPKRkd cells have MVBs/exosomes, it was hypothesized that using these two cell lines would enable us to identify compounds selectively targeting rich lysosomes in PKR-positive tumors or rich MVBs/exosomes in PKR-negative tumors.

Anticancer effects of PKR-targeting compounds depend on PKR expression status: To identify compounds that can target lysosomes in PKR-positive cells or MVBs/exosomes in PKR-negative cells, the 10,000-compound ChemBridge library was screened for compounds with different effects on the growth of HeLa and HeLaPKRkd cells. By examining morphologic changes in the cells using microscopy and cell growth inhibition using a sulforhodamine B (SRB) assay, Pac 1 and Pac 2 were identified. Microscopic analysis of morphologic changes in HeLa and HeLaPKRkd cells demonstrated that treatment with Pac 1 suppressed the growth of HeLa cells more effectively than did treatment with Pac 2, whereas Pac 2 suppressed the growth of HeLaPKRkd cells more effectively than did Pac 1. SRB assays were next used to determine cell viability after treatment with Pac 1 or Pac 2. The viability of HeLa cells was suppressed more effectively by Pac 1 than by Pac 2, whereas the viability of HeLaPKRkd cells was suppressed more effectively by Pac 2 (FIGS. 5A and B). These results suggested that sensitivity to Pac 1 and Pac 2 depends on PKR status, as PKR-positive cells were sensitive to Pac 1, whereas PKR-negative cells were sensitive to Pac 2.

Figure 5H:
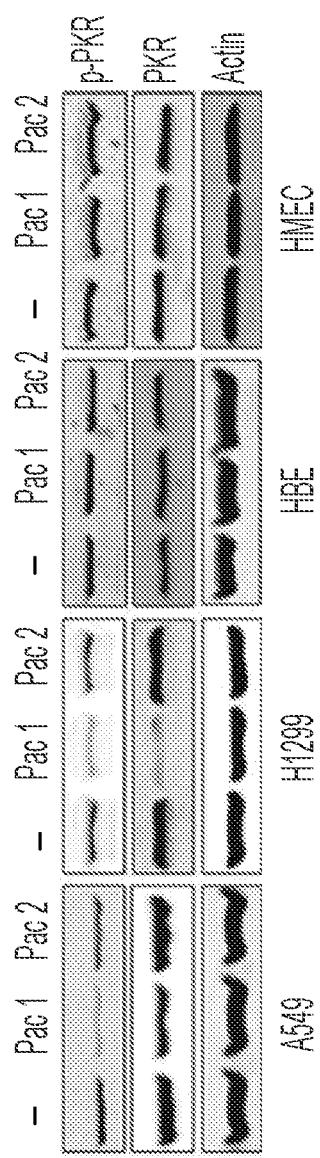
Figure 5G:
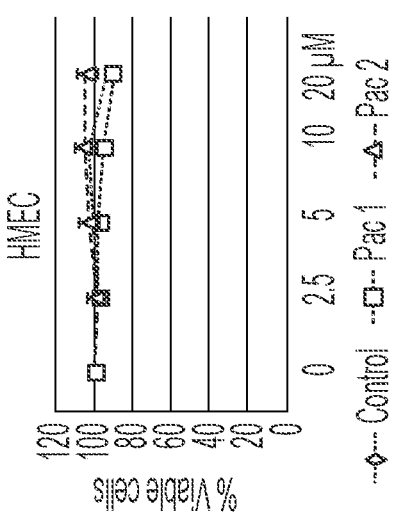
Figure 5L:
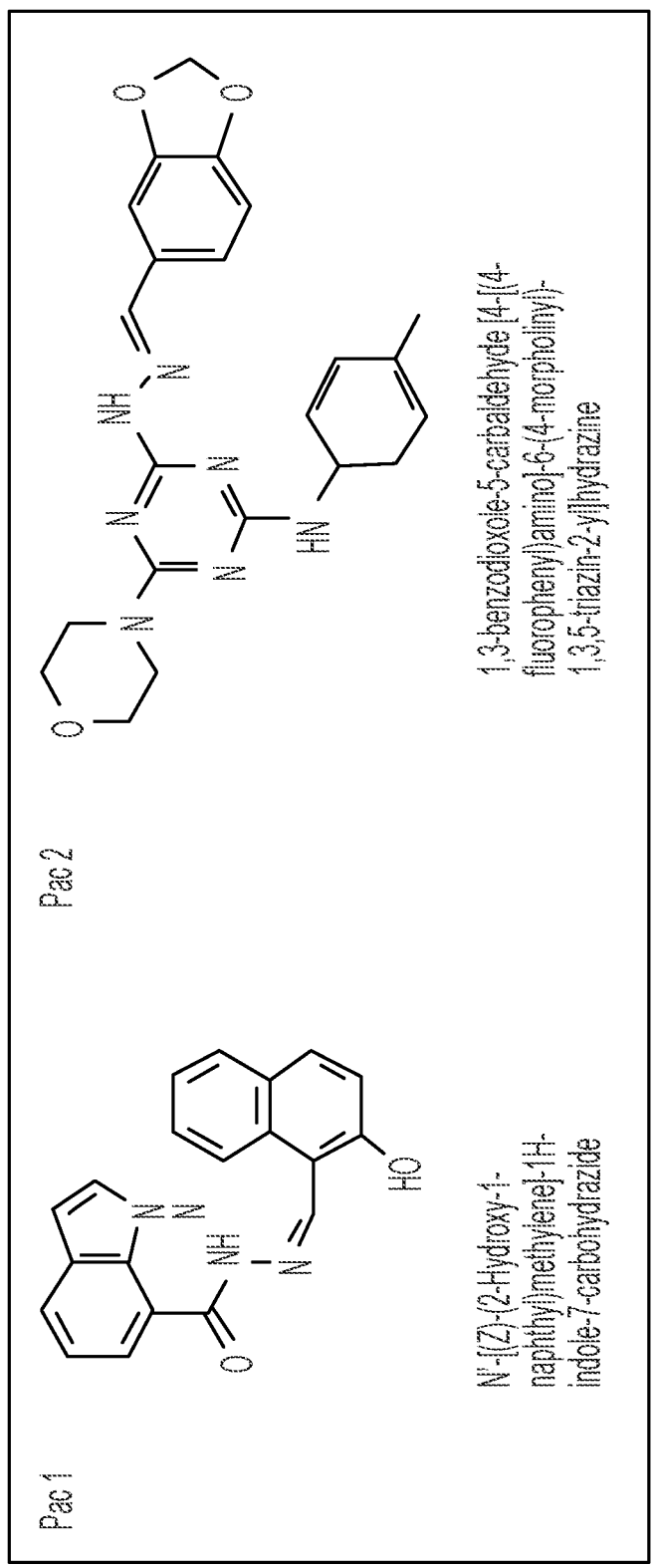

The effects of Pac 1 and Pac 2 were next examined on PKR protein expression in HeLa cells using Western blot analysis. It was found that treatment with Pac 1 but not Pac 2 significantly reduced the expression of PKR and p-PKR (FIG. 5C). In addition, two tested human lung cancer cell lines (A549 and H1299) were more sensitive to treatment with Pac 1 than that with Pac 2 (FIGS. 5D and E). No reduction in normal cell viability was observed after treatment with Pac 1 or Pac 2 (FIGS. 5F and G). Using Western blotting, it was confirmed that Pac 1 but not Pac 2 markedly reduced PKR and p-PKR expression in A549 and H1299 cells but not in normal HBE or human mammary epithelial cells (FIG. 5H). Additionally, treatment with Pac 1 reduced PKR expression in and inhibited the growth of breast cancer cell lines (FIG. 12A-D). Because most of the cancer cell lines that were tested were more sensitive to Pac 1 than to Pac 2, Pac 1 was further investigated. Intravenous injection of mice with Pac 1 inhibited the growth of MDA-MB-231 (FIG. 5I) and H1299 (FIG. 5J) tumor xenografts over 4 weeks. Pac 1 also dramatically suppressed the expression of PKR, p-PKR, and Ki-67 protein in H1299 tumors (FIG. 5K). FIG. 5L shows the structures of Pac 1 and Pac 2. Taken together, these data demonstrated that treatment with Pac 1 did not affect normal cells but selectively killed cancer cells depending on their PKR status.

Figure 14A:
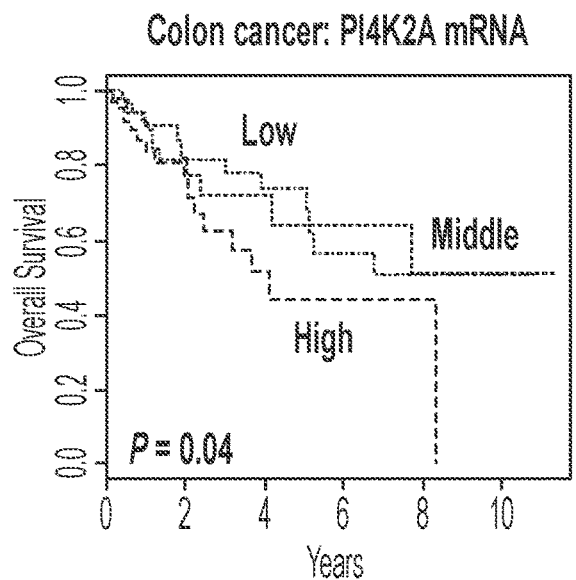
FIGS. 14A-14C: Prognostic significance of PI4K2A expression in colon cancer patients and effects of treatment with Pac 1 on a colon cancer cell line. A, Association between EIF2AK2 or PI4K2A gene expression and overall survival in the TCGA colorectal cancer data set. High levels of PI4K2A gene expression were associated with low overall survival rates. B, Viability of LOVO colon cancer cells as determined using an SRB assay 72 hours after treatment with Pac 1 or Pac 2. C, Western blot of the expression of PKR, p-PKR, and PI4K2A protein in colon cancer cells 72 hours after treatment with Pac 1 at various doses.
Figure 14B:
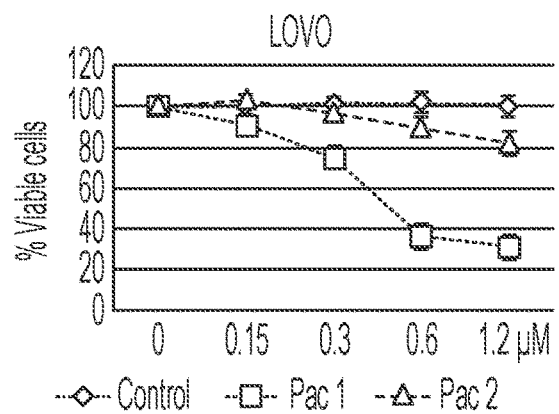
Figure 14C:
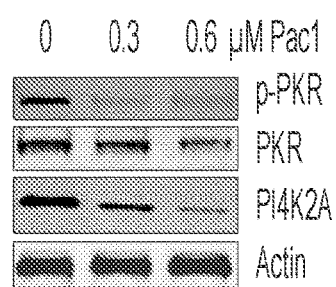

PKR/PI4K2A lysosome network is a potential target for Pac 1: To determine the mechanism of cell growth inhibition by Pac 1, a high-throughput enzymatic screening assay was performed to identify targets of Pac 1. PKR was screened as well as a recombinant human protein panel consisting of 366 wild-type kinases, 175 mutant kinases, 20 atypical kinases, and 17 lipid kinases. It was found that Pac 1 did not inhibit PKR kinase activity. However, it was observed that Pac 1 inhibited the activity of PI4K2A kinase (FIG. 6A) but not other kinases, including PI4KIIb, PI4KIIIa, PI4KIIIb, PI3Ka, PI3Kb, and PI3 Kg. Pac 1 exhibited the greatest inhibitory effect on PI4K2A kinase activity (half-maximal inhibitory concentration, 2.5 µmol/L). PI4K2A is associated with adaptor-related protein complex 3 (AP-3) protein and is involved in the biogenesis of lysosomes by directing the sorting of lysosomal membrane proteins to lysosomes (FIG. 6B). Molecular docking is one of the most frequently used methods in structure-based drug design due to its ability to predict the binding conformation of small-molecule ligands to the appropriate target-binding site. Using molecular docking, it was confirmed that Pac 1 can bind to PI4K2A, but not 4EBP1 and modulate PI4K2A activity at low concentrations (FIG. 14).

Figures 6D, 6E:
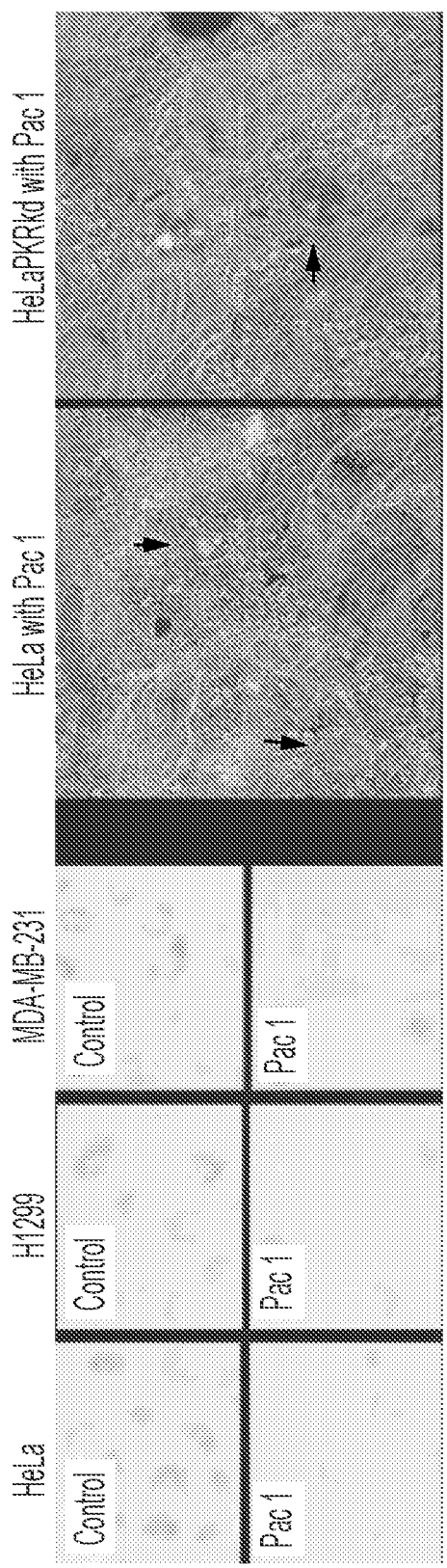

Western blotting was next used to evaluate proteins known to be involved in AP-1/2/3 complexes in lung (H1299) and breast (MDA-MB-231) cancer cells after treatment with Pac 1 or Pac 2. Unlike control and Pac 2-based treatment, Pac 1 (5 µM) significantly inhibited PI4K2A, Lamp1, Lamp2, and AP-3δ expression in H1299 and MDA-MB-231 cells (FIG. 6C). No reduction of expression was observed for proteins associated with AP-1 (Rab7α, HSC70, and AP-1γ) or AP-2 (AP-2α) in either cancer cell line 72 hours after treatment with Pac 1 or Pac 2. AP-1 and AP-2 mediate protein sorting in the endosome, trans-Golgi network, and plasma membrane. Ut was found that inhibition of PI4K2A expression decreased the stability of AP-3 and associated client proteins. The impact of Pac 1 was then investigated on lysosome function by staining cells with the acidophilic dye LysoTracker Red. It was observed that Pac 1-based treatment substantially decreased the numbers of acidic vesicular organelles in HeLa, H1299, and MDA-MB-231 cells (FIG. 6D). TEM analyses revealed destruction of lysosomes in HeLa cells and a lack of lysosomes but enrichment of MVBs/exosomes in HeLaPKRkd cells after treatment with Pac 1 (FIG. 6E).

Figure 6G:
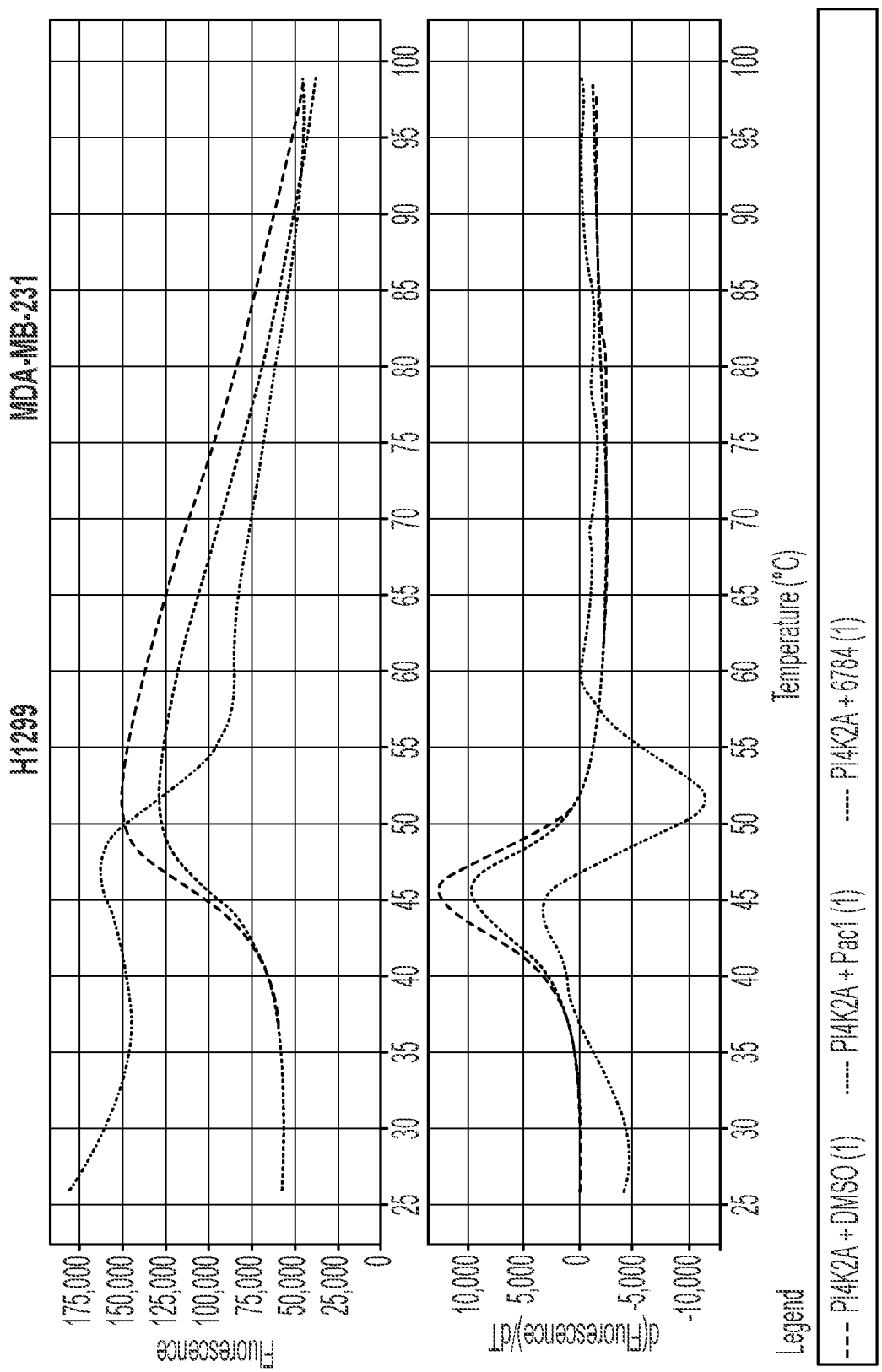

Next, it was investigated whether Pac 1 disrupts the PI4K2A-associated PKR network and contributes directly to destabilization of cancer cell lysosomes. H1299 and MDA-MB-321 cells treated with phosphate-buffered saline (PBS), Ad-Luc alone, Ad-Prion alone, or a combination of Ad-Prion and Pac 1 were immunoprecipitated with an anti-PI4K2A antibody and then immunoblotted them with an anti-PKR antibody. FIG. 6F shows that the amount of PKR coimmunoprecipitated with PI4K2A was dramatically greater in both cancer cell lines after treatment with Ad-Prion. However, the amount of PKR coimmunoprecipitated with PI4K2A decreased to undetectable levels in both cell lines after treatment with the combination of Ad-Prion and Pac 1. Pac 1 produced a substantial change in the differential scanning fluorimetry curve as compared with the PI4K2A protein alone (FIG. 6G). It was detected that Pac 1 binds to PI4K2A and causes a decrease in the melting temperature of PI4K2A protein. A differential scanning fluorimetry assay demonstrated that Pac 1 not only interacted directly with PI4K2A but also destabilized it. Taken together, these results suggested that treatment with Pac 1 inhibits cancer cell growth via impairment of lysosome function triggered by disruption of the PKR/PI4K2A lysosome network.

Figures 7A, 7B, 7C, 7D, 7E, 7F:
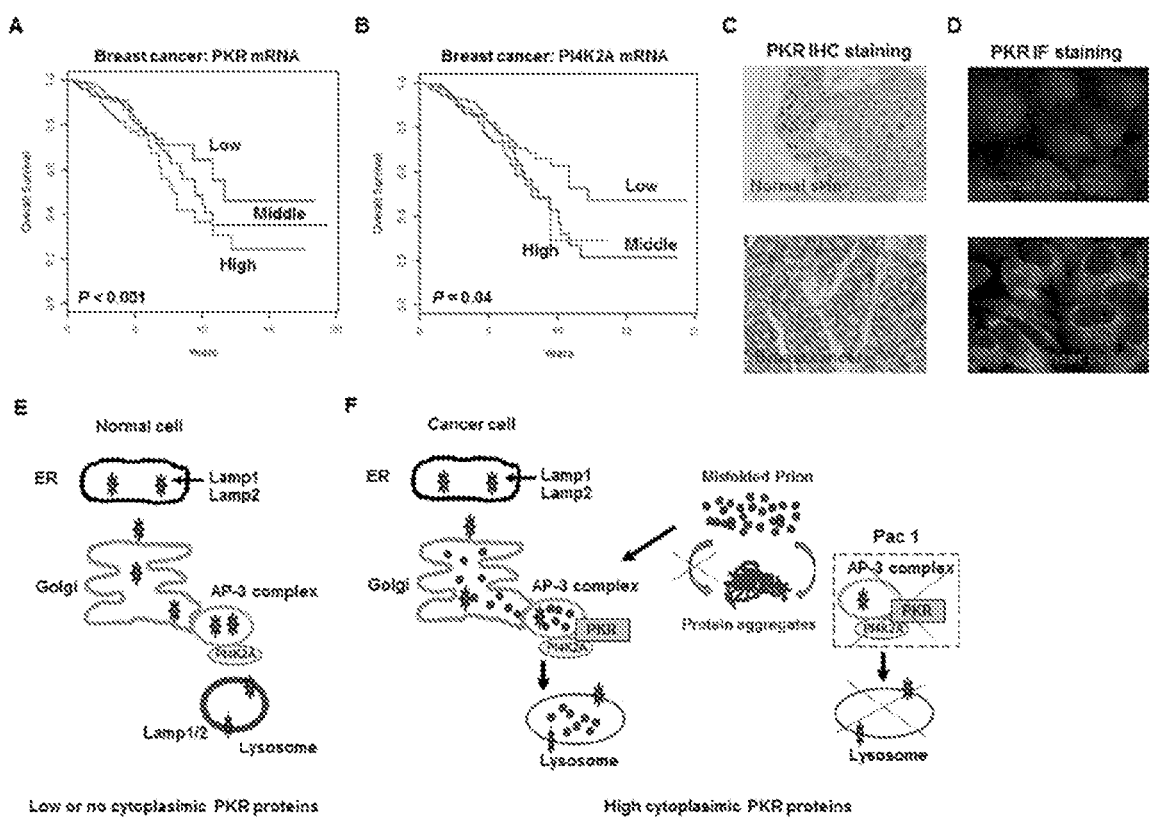
FIGS. 7A-7F: Prognostic significance of PKR and PI4K2A expression in cancer patients. A and B, PKR and PI4K2A are encoded by the EIF2AK2 and PI4K2A genes, respectively. In the TCGA data analysis, high levels of EIF2AK2 (A) and PI4K2A (B) gene expression were associated with low overall survival rates in breast cancer patients. C, Immunohistochemical stains showing expression of PKR in normal skin and breast tumor samples. D, Immunofluorescent (IF) stains showing cytosolic localization of PKR in breast cancer cells and a nuclear PKR expression pattern in normal cells. E, The proposed mechanism of action of PI4K2A network in normal cells. ER, endoplasmic reticulum. F, The proposed mechanism of action of Pac 1 in cancer cells.

PKR and PI4K2A expression are associated with poor prognosis in cancer patients: PKR and PI4K2A are encoded by the EIF2AK2 and PI4K2A genes, respectively. In an analysis of data in The Cancer Genome Atlas (TCGA), it was found that high levels of EIF2AK2 gene expression were associated with low overall survival rates in pancreatic cancer patients and that high levels of PI4K2A gene expression were associated with low overall survival rates in colorectal cancer patients (RNA sequencing data set; TCGA). Using this data set, the association between EIF2AK2 or PI4K2A gene expression and overall survival was evaluated in breast cancer patients. It was found that high levels of EIF2AK2 and PI4K2A gene expression were associated with low overall survival rates in breast cancer patients (FIGS. 7A and B). It was also examined the expression of PKR using immunohistochemical staining of five normal skin and five breast tumor samples and observed that all of the breast tumor cells had high cytoplasmic PKR expression (FIG. 7C). However, all of the normal skin cells had low cytoplasmic PKR expression, and some of them had high nuclear PKR expression. It was also found that cytosolic localization of PKR in breast cancer cells and a nuclear expression pattern for PKR in normal cells via immunofluorescent analysis (FIG. 7D). Furthermore, the association between EIF2AK2 or PI4K2A gene expression and overall survival was evaluated in colorectal cancer patients using the TCGA data set. It was observed that high levels of PI4K2A (FIG. 14A) but not EIF2AK2 gene expression were associated with low overall survival rates. Treatment with Pac 1 inhibited the growth of and reduced PKR, p-PKR, and PI4K2A expression in LOVO colon cancer cells (FIGS. 14B and C).

Figures 15A, 15B:
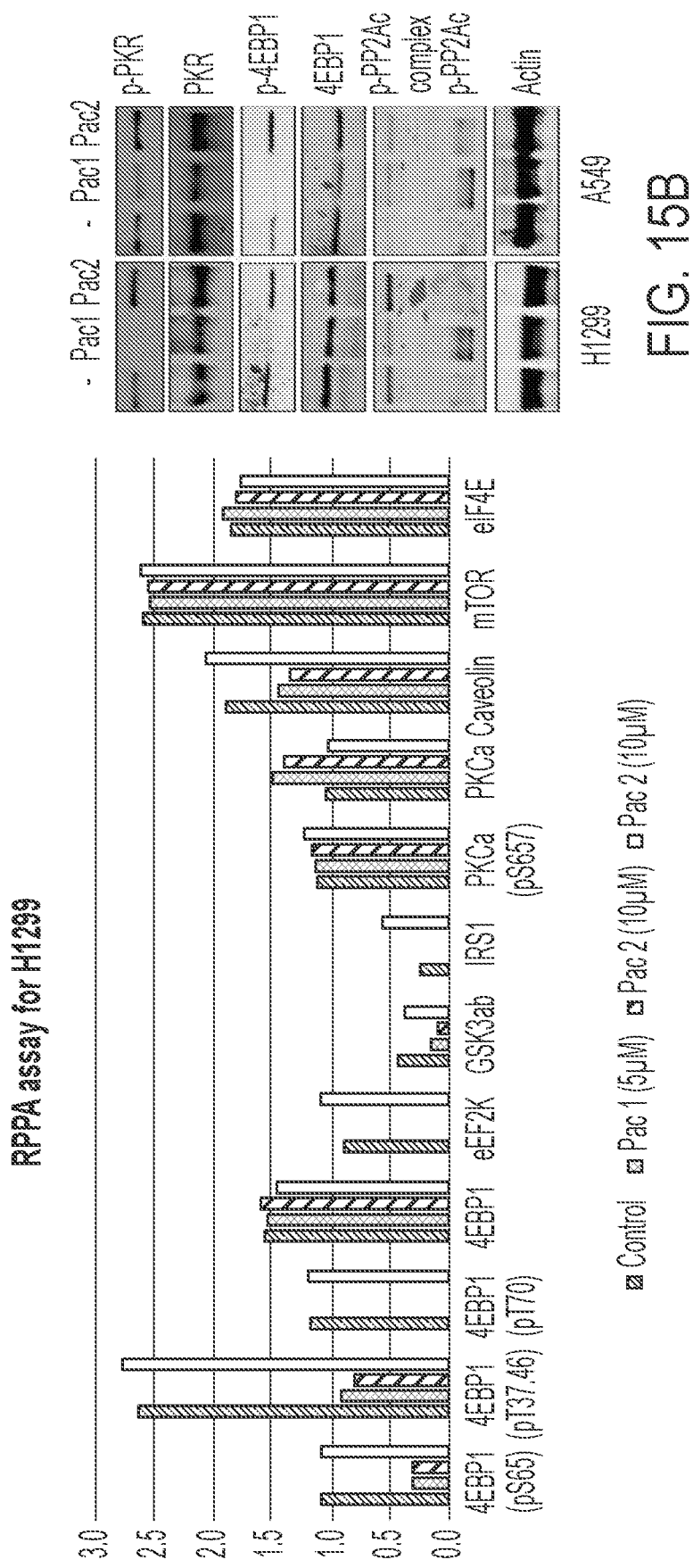
FIGS. 15A-15B: Pac 1 inhibits several proteins. (A) Levels of protein markers in H1299 cells 72 hours after treatment with Pac 1 (5 and 10 µM) or Pac 2 (10 µM) as determined using an RPPA assay. (B) Western blot of the expression of PKR, p-PKR, p-4EBP1, 4EBP1, and p-PP2Ac protein in H1299 and A549 cells 72 hours after treatment with 51.1M Pac 1 or Pac 2. Actin expression was used as a loading control in all blots.

Pac 1 inhibits several proteins: High-throughput enzymatic screening for Pac 1 also demonstrated that treatment with it markedly inhibited PIM3/1 activity. The translation regulator eukaryotic elongation factor 4EBP1 is phosphorylated by and is a substrate of PIM3 and PIM1. To further determine whether treatment with Pac 1 affects PIM3/1 downstream targets, the expression of 156 proteins in H1299 and A549 cells was analyzed after treatment with Pac 1 or Pac 2 using an RPPA assay. Unlike control and Pac 2 treatment, Pac 1 (5 and 10 µM) significantly inhibited p-4EBP1 (S65, T37, and T70), eEF2K, GSK3ab, IRS1 and Caveolin in H1299 cells (FIG. 15A) and A549. Consistent with the RPPA results, a reduction of expression of p-4EBP1 (T70) protein was observed in H1299 and A549 cells 72 hours after treatment with Pac 1 but not Pac 2 in Western blotting (FIG. 15B). Reduction of expression of PKR and p-PKR protein was also observed in these two cell lines after treatment with Pac 1 (FIG. 15B). Others reported cross-talk of PP2A with PKR and 4EBP1 protein in cancer cells. Inactivation of PP2A was observed, indicated by dissociation of the p-PP2Ac complex in H1299 and A549 cells after Pac 1-based treatment (FIG. 15B).

Antiproliferative effect of Pac 1 and Pac 2 on an oncopanel of lung cancer cell lines: The antiproliferative effect of treatment with Pac1 were further tested on an oncopanel of 127 cell lines of various lung tumor origins. Sixty-five percent of the cell lines were sensitive to Pac 1 ($IC_{50}$, 0.01-0.95 μM) (FIG. 16A). RPPA analysis of Pac 1-sensitive cells identified correlation with higher expression of GSK3 (FIG. 16B), and Pac 1-resistant cells correlation with higher expression of IRS1, Caveolin and PKCA (PS657) (FIG. 16B). Analyzed the Pac1 sensitivity with gene mutation observed that low Pac 1 IC50 correlated with VCAN and ZNF804A mutation, and high Pac 1 IC50 correlated with LOXHD1 and CDH12 mutation (FIG. 16C). VCAN mutant lung cancer cells are sensitive to treatment of Pac 1. IC50 values of lung cancer cell lines to inhibition by Pac 1 showing significantly more VCAN mutants are sensitive than VCAN wild-type cells; two-sided Student's t-test was computed for the difference of means, P=0.002.

Figure 17:
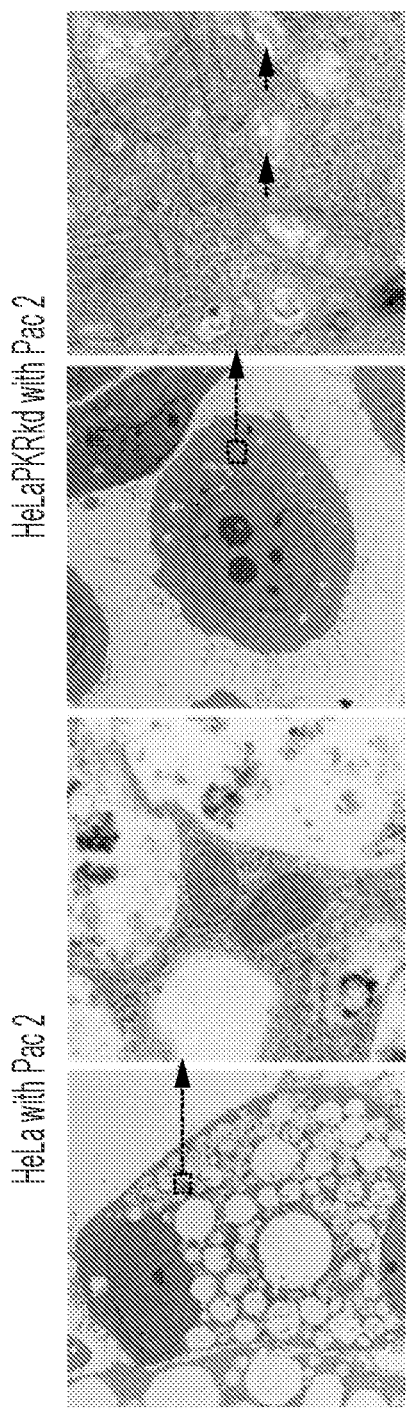
FIG. 17: Pac 2 induced lysosomal exocytosis.

Pac 2 induced lysosomal exocytosis: Unlike HeLaPKRkd cells, HeLa cells were not sensitive to Pac 2-based treatment. The TEM analyses demonstrated that Pac 2 induced lysosomal exocytosis in HeLa cells but not HeLaPKRkd cells (FIG. 17), suggesting that this effect is PKR-dependent. Treatment of HeLaPKRkd cells with Pac 2 destroyed MVBs/exosomes (FIG. 17).

In conclusion, the results of the present study demonstrated that human lung cancer cells but not normal cells release large quantities of misfolded PrPs and that PKR prevents this release. It was found that PKR contributes directly to lysosome function and that loss of PKR in cancer cells impairs lysosome function. Treatment with Pac 1 disrupts the PKR/PI4K2A network, impairing lysosome function and inhibiting growth of various types of cancer cells in vitro and in vivo. On the basis of these findings, it was concluded that using Pac 1 to target PKR/PI4K2A lysosome networks is a promising approach to cancer therapy.

Example 2—Materials and Methods

Cell lines: Human lung cancer (A549, H1299, H1792, H460, H322, H292, and H226), breast cancer (MDA-MB-231 and MCF-7), and colon cancer (LOVO) cell lines were obtained from the ATCC (Manassas, VA). All cell lines were maintained in Dulbecco's modified essential medium or RPMI 1640 medium supplemented with 10% fetal bovine serum, 10 mM glutamine, 100 U/mL penicillin, and 100 mg/mL streptomycin (Life Technologies, Inc., Grand Island, NY). The normal HBE cell line was purchased from Clonetics (Walkersville, MD). HBE cells were cultured in serum-free keratinocyte medium (Invitrogen, Carlsbad, CA). Normal human mammary epithelial cells were obtained from the ATCC. HeLa (PKR wild-type) and HeLaPKRkd cells were provided by Dr. Charles Samuel (University of California, Santa Barbara) and were described previously (20,26).

Antibodies and chemicals: An antibody against PKR (sc-707) was obtained from Santa Cruz Biotechnology (Santa Cruz, CA). Anti-p-PKR (pT451, 1120-1) and -p-eIF2α (S51) antibodies were obtained from Epitomics (Burlingame, CA), and an anti-paxillin antibody (catalog #2542) was obtained from Cell Signaling Technology (Beverly, MA). A mouse anti-β-actin antibody was obtained from Sigma-Aldrich (St. Louis, MO). The misfolded anti-PrP antibody AMF-1c-120 was provided by Amorfix Life Sciences Ltd. (Mississauga, ON, Canada). Rabbit monoclonal antibodies against native PrP (EP1802Y) and BAG3 (catalog #ab92309) were purchased from Abcam (Cambridge, UK). Alexa Fluor 488 goat anti-rabbit immunoglobulin G (H+L) was purchased from Life Technologies.

Adenoviral transfection and western blotting: An adenoviral vector carrying the wild-type PKR gene (Ad-PKR) previously developed by our group was used in this study. Cells were transfected with Ad-PKR or Ad-Luc, and cell extracts were prepared 48 hours later. The cell extracts were subjected to Western blotting (Guo et al., 2015). To determine the roles of lysosomes in PKR-mediated protein degradation, lysosome function was inhibited using 3MA (Sigma-Aldrich). Cancer cells were seeded in six-well plates ($2\times10^5$ cells/well) in RPMI 1640 medium overnight. The next day, Ad-Prion or control Ad-Luc was added for 24 hours, and 3MA (1 mM) was added for an additional 24 hours. Cells were then collected for Western blotting.

LysoTracker red staining, confocal microscopy, and tem: The acidophilic dye LysoTracker Red stains lysosomes. Cancer cells ($1\times10^5$ cells/well) were grown on two-well chamber slides (Becton Dickinson Labware, Bedford, MA) to 70% confluence and then treated with PKR siRNA or control siRNA. Forty-eight hours later (when cells had grown to 70-80% confluence), the medium was replaced with medium containing 75 nM LysoTracker Red. The cells were incubated with LysoTracker Red for 1 hour and then rinsed one time with 1 mL of PBS. The cells were kept in PBS for microscopic imaging.

For confocal microscopic imaging of Lamp1, HeLa and HeLaPKRkd cells ($1\times10^5$ cells/well) were grown on two-well chamber slides to 70% confluence and then transfected with Ad-Lamp1-GFP (Life Technologies). The cells were washed with PBS after 48 hours and fixed with 4% paraformaldehyde/PBS for imaging.

For confocal microscopic imaging of PrP, HeLa and HeLaPKRkd cells ($2-4\times10^4$ cells/well) were grown on eight-well chamber slides (Falcon, Big Flats, NY) to 70% confluence and then transfected with Ad-Prion. The cells were washed with PBS after 48 hours and fixed with 4% paraformaldehyde/PBS for confocal microscopy as described previously (28). Cells were blocked with 1% normal goat serum for 1 hour and then incubated for 1 hour at a dilution of 1:100 with the primary native anti-PrP antibody. Next, the slides were washed to remove the primary antibody, rinsed with PBS, and exposed to the secondary antibody, a rabbit antibody-Alexa Fluor 488 conjugate (Molecular Probes, Life Technologies), for about 30 minutes at room temperature. The slides were then mounted with ProLong Gold antifade reagent containing 4',6-diamidino-2-phenylindole (Invitrogen) and analyzed under a FluoView FV500 laser confocal microscope (Olympus America, Melville, NY) after adjustment for background staining.

Flow cytometry: For detection of misfolded proteins, primary normal cells, primary tumor cells, or cancer cells transfected with adenoviral vectors (Ad-PKR, Ad-Luc, or Ad-Prion) were dissociated with cell dissociation buffer (Life Technologies; catalog #13151014). The collected cells were washed with PBS and suspended in FACS staining buffer (2% fetal bovine serum and 0.02% azide in PBS), and the misfolded anti-PrP antibody AMF-1c-12 (20 μL) or native anti-PrP antibody EP1802Y (20 μL) was added. The cells then were incubated at 4° C. for 30 minutes and spun at a relative centrifugal force of 500 for 5 minutes at 4° C. They then were washed three times with 100 μL of FACS staining buffer. After the final wash, the cells were resuspended in a secondary antibody solution (50 μL of 3 μg/mL anti-rabbit IgG AF488), incubated at 4° C. for 30 minutes, and spun at a relative centrifugal force of 500 for 5 minutes at 4° C. Next, they were washed three times with 100 μL of FACS staining buffer. After the final wash, the cells were resuspended in 100 μL of a propidium iodide solution (1 μg/mL) and subjected to FACS analysis.

Isolation and quantitation of exosomes: Exosomes were collected from 5 mL of media from cell culture ($1\text{-}2\times10^7$). The culture media were collected, subjected to centrifugation at 800×g for 10 minutes to sediment the cells, and centrifuged at 12,000×g for 30 minutes to remove the cellular debris. The exosomes were separated from the supernatant via centrifugation at 100,000×g for 2 hours. The exosome pellet was washed once in a large volume of PBS and resuspended in 100 μL of PBS to yield the exosome fraction. The amount of released exosomes was quantified by measuring the activity of acetylcholinesterase, an enzyme that is specifically directed to these vesicles. Acetylcholinesterase activity was assayed by following a procedure described previously (Savina et al., 2003). Briefly, 25 μL of the exosome fraction was suspended in 100 μL of phosphate buffer and incubated with 1.25 mM acetylthiocholine and 0.1 mM 5,5'-dithiobis(2-nitrobenzoic acid) in a final volume of 1 mL. The incubation was carried out in cuvettes at 37° C., and the change in absorbance at 412 nm was observed continuously. The data reported represent the enzymatic activity after 20 minutes of incubation.

Analysis of in vivo tumor growth after treatment with Pac 1: For in vivo tumor studies, MDA-MB-231 or H1299 cells ($\sim 1\times10^6$) were resuspended in 0.1 mL of PBS and injected subcutaneously into the flanks of female severe combined immunodeficiency mice. When the resulting tumors reached 100-150 mm³ in volume, the mice were stratified into groups of eight animals, with each group having approximately equal mean tumor volumes, and administered intravenous injection of Pac 1. The animals were weighed weekly, and their tumor diameters were measured twice weekly. When a tumor reached 2000 mm³ or became necrotic, the animal was killed. Tumors obtained from mice that did or did not receive Pac 1 were analyzed immunohistochemically for PKR, p-PKR, and Ki-67 protein expression.

Thermal shift assay: Recombinant PI4K2A protein purified from a plasmid encoding $PI4K2A_{76-465}$ protein was provided by Evzen Boura (Marchal et al., 2014). A thermal shift assay was performed using a 7500 Fast Real-Time PCR System (Applied Biosystems). Each reaction solution contained 5 mmol/L PI4K2A, 5 SYPRO Orange Protein Gel Stain (Sigma-Aldrich), and the test compounds in 20 mL of buffer (50 mmol/L HEPES, pH 7.5, 150 mmol/L NaCl, 2 mmol/L $MgCl_2$), which was heated from 25° C. to 95° C. at a 1% ramp rate. The melting temperature was calculated using the Boltzmann fitting method with the Protein Thermal Shift software program (version 1.1; Applied Biosystems). Each reaction was repeated three times.

Statistical analysis: In vitro data reported in the figures represent the means (±standard deviation) from three independent experiments. In evaluating differences between treated and untreated groups. The differences between treatment groups in xenograft experiments were determined by using a one-sided exact Wilcoxon-Mann-Whitney test. A P value less than 0.05 was considered significant.

Cell viability assays: For SRB assays, cells ($2\text{-}8\times10^3$/well in 100 μL of culture medium) were seeded in 96-well flat-bottomed plates and treated the next day with compounds at the indicated concentrations. After the indicated treatments, cells were fixed with trichloroacetic acid. The protein was stained with SRB, and the optical density at 570 nm was determined. Relative cell viability was calculated by setting the viability rate of the control cells (exposed only to dimethyl sulfoxide) at 100% and comparing the viability of the treated cells with that of the controls. The experiments were performed at least three times for each cell line. The viability of leukemia cell lines was determined by using a 3-(4,5-dimethylthiazol-2-yl)-2,5-diphenyltetrazolium bromide assay.

Knockdown of PKR: For inhibition of PKR expression by siRNA, cells were seeded in six-well plates ($2\times10^5$ cells/well) in medium overnight. The next day, PKR siRNA (5 μg) or control siRNA (5 μg) was added, and the cells were incubated for 48 hours. Cells then were dyed with LysoTracker Red or collected for Western blotting. PKR siRNA and control siRNA were purchased from Santa Cruz Biotechnology.

Chemical library: A chemical library of 10,000 compounds and their analogs was obtained from ChemBridge Corporation. The chemicals in this library were provided at a concentration of 5 mg/mL in dimethyl sulfoxide. Each compound was dissolved in dimethyl sulfoxide to a concentration of 10 mM and stored at 4° C. as a master stock solution.

Identification of PKR-associated compounds and cytotoxicity studies: The library of 10,000 compounds was screened for those with different effects on the growth of HeLa and HeLaPKRkd cells. For this screening, both HeLa and HeLaPKRkd cells were seeded in 96-well plates in parallel and treated with each compound at a final concentration of 5 μg/mL. Cells treated with dimethyl sulfoxide (final concentration, 1%) were used as controls. Treated cells were observed under a microscope to detect morphologic changes, and their viability was determined using SRB assays 2 and 3 days after treatment. The compounds initially observed to have different effects on HeLa and HeLaPKRkd cells were subjected to two confirmatory screenings.

For the SRB assay, cells ($2\text{-}8\times10^3$/well in 100 μL of culture medium) were seeded in 96-well flat-bottomed plates and treated the next day with compounds at the indicated concentrations. After treatment for the indicated times, cells were fixed with trichloroacetic acid. The cells were stained using SRB, and the optical density at 570 nm was determined. Relative cell viability was determined by setting the viability of the control cells (exposed only to dimethyl sulfoxide) at 100% and comparing their viability with that of the treated cells. The experiments were performed at least three times for each cell line.

Anticancer effects of PKR-modulating compounds in vivo: To determine the toxicity of these compounds in mice, 50 mg/kg Pac 1 or Pac 2 was injected intravenously into six 10-week-old BALB/c mice (three mice per treatment) daily for 7 days. No weight loss or apparent adverse or distressing effects on the well-being of the mice were observed. Pathologists at MD Anderson carried out blood chemistry analysis and histopathologic examination of organs in the Pac 1- and Pac 2-injected mice. Blood analysis suggested that the mice receiving either compound had normal aspartate aminotransferase, serum glutamic-oxaloacetic transaminase, serum glutamic-pyruvic transaminase, alkaline phosphatase, creatine kinase, and lactate dehydrogenase levels. Histopathologic examination indicated no significant changes in any major organs, including the heart, lungs, liver, kidneys, pancreas, and spleen.

Immunoprecipitation analysis: Cancer cells were treated with PBS, Ad-Luc, Ad-Prion, Ad-Prion plus Pac 1 for 48 h, and then subjected to lysis in RIPA buffer (1×PBS, 1% Nonidet P-40, 0.5% sodium deoxycholate, 0.1% sodium doclecyl sulfate (SDS). Cell lysates (500 µl [500 µg]) were incubated with primary antibody overnight at 4° C. Protein A/G agarose was added to the mix which was incubated for a further 4 h. Beads were pelleted by centrifugation at 2500 rpm for 5 min at 4° C. and washed 4 times with 1 ml of RIPA buffer. After the last wash, 50 µl of 1×SDS-polyacrylamide gel electrophoresis sample buffer was added to the beads. This preparation was subjected to vortexing and then boiled for 5 min. It was centrifuged at 2500 rpm for 1 min before the supernatants were loaded on gels.

Kinases activity assay: The ADP-Glo kinase assay was used to evaluate the kinase activities of PKR, PI4K2A, PI4KIIb, PI4KIIIa, PI4KIIIb, PI3Ka, PI3Kb, PI3 Kg by Reaction Biology.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Barber, Cell Death Differ 2001; 8(2):113-26.
Cohen et al., Nature 2003; 426(6968):905-9.
Guo et al., Oncotarget 2015.
Hamouda et al., Oncotarget 2014; 5(15):6252-66.
Hugon et al., Expert Rev Neurother 2009; 9(10):1455-7.
International Patent Publication No. WO 00/37504
International Patent Publication No. WO 01/14424
International Patent Publication No. WO 98/42752
International Patent Publication No. WO2006/121168
International Patent Publication No. WO2008/121949
International Patent Publication No. WO2009/101611
International Patent Publication No. WO2009/114335
International Patent Publication No. WO2010/027827
International Patent Publication No. WO2011/053435
International Patent Publication No. WO2011/066342
International Patent Publication No. WO2014/087413
Kirkegaard et al., Nature 2010; 463(7280):549-53.
Marchal et al., The FASEB Journal 2014; 28(5):1965-74.
Savina et al., J Biol Chem 2003; 278(22):20083-90.
U.S. Pat. No. 8,119,129
U.S. Pat. No. 6,207,156
U.S. Pat. No. 6,232,287
U.S. Pat. No. 6,528,481
U.S. Pat. No. 7,452,964
U.S. Pat. No. 7,671,010
U.S. Pat. No. 7,781,565
U.S. Pat. No. 8,017,114
U.S. Pat. No. 8,450,278
U.S. Pat. No. 8,507,445
U.S. Patent Publication No. 2006/0034925
U.S. Patent Publication No. 2006/0115537
U.S. Patent Publication No. 2006/0223114
U.S. Patent Publication No. 2006/0234299
U.S. Patent Publication No. 2007/0148095
U.S. Patent Publication No. 2012/0141550
U.S. Patent Publication No. 2013/0138032
U.S. Patent Publication No. 2014/0024610

What is claimed is:

1. A method for treating cancer in a subject comprising administering an effective amount of a Protein Kinase RNA-Dependent (PKR)-associated compound to the subject, wherein the subject is determined to have a PKR-positive and is administered a PKR-associated compound selected from the group consisting of N'[(Z)-(2-Hydroxy-1-naphthyl)methylene-1H-indole-7-carbohydrazide (Pac 1), N'—[(Z)-(3-Allyl-2-hydroxyphenyl)methylene]-1H-indole-7-carbohydrazide (Pac 1A1), and N'—[(Z)-(2-Hydroxyphenyl)methylene]-1H-indole-7-carbohydrazide (Pac 1A2), or wherein the subject is determined to have a PKR-negative cancer and the PKR-associated compound is 1,3-benzodioxole-5-carbaldehyde [4-[(4-fluorophenyl)amino]-6-(4-morpholinyl)-1,3,5-triazin-2-yl]hydrazine (Pac 2).

2. The method of claim 1, wherein the PKR-associated compound is N'[(Z)-(2-Hydroxy-1-naphthyl)methylene]-1H-indole-7-carbohydrazide (Pac 1), or 1,3-benzodioxole-5-carbaldehyde [4-[(4-fluorophenyl) amino]-6-(4-morpholinyl)-1,3,5-triazin-2-yl] hydrazine (Pac 2).

3. The method of claim 1, wherein the PKR-associated compound is N'—[(Z)-(3-Allyl-2-hydroxyphenyl)methylene]-1H-indole-7-carbohydrazide (Pac 1A1) or N'—[(Z)-(2-Hydroxyphenyl)methylene]-1H-indole-7-carbohydrazide (Pac 1A2).

4. The method of claim 1, wherein the cancer is lung cancer, breast cancer, colon cancer, or leukemia.

5. The method of claim 1, wherein the subject has previously been resistant to radiation or chemotherapy.

6. The method of claim 1, wherein the subject is further administered an immune checkpoint inhibitor.

7. The method of claim 6, wherein the immune checkpoint inhibitor is an anti-PD1 antibody, anti-CTLA4 antibody or anti-PD-L1 antibody.

8. The method of claim 7, wherein immune checkpoint inhibitor is an anti-PD1 antibody selected from the group consisting of nivolumab, pembrolizumab, pidillizumab, AMP-514, REGN2810, CT-011, BMS 936559, MPDL328OA and AMP-224.

9. The method of claim 7, wherein the immune checkpoint inhibitor is an anti-CTLA-4 antibody selected from the group consisting of tremelimumab, and ipilimumab.

10. The method of claim 7, wherein the immune checkpoint inhibitor is an anti-PD-L1 antibody selected from the group consisting of atezolizumab, avelumab, and durvalumab.

11. A method of inhibiting PKR expression and/or lysosomal function in a subject comprising administering an effective amount of Pac 1, Pac 2, Pac 1A1, or Pac 1A2 to the subject.

* * * * *